United States Patent [19]

Schultz

[11] Patent Number: 6,012,109
[45] Date of Patent: Jan. 4, 2000

[54] VIDEO CAPTURE DEVICE WITH ADJUSTABLE FRAME RATE BASED ON AVAILABLE BUS BANDWIDTH

[75] Inventor: Kevin Schultz, Georgetown, Tex.

[73] Assignee: National Instruments Corporation, Austin, Tex.

[21] Appl. No.: 08/926,374

[22] Filed: Sep. 9, 1997

[51] Int. Cl.[7] .................................................. G06F 12/00
[52] U.S. Cl. .............................................. 710/56; 710/22
[58] Field of Search ................................ 710/22, 52–56; 709/236, 250; 345/520, 521

[56] References Cited

U.S. PATENT DOCUMENTS 5,432,908  7/1995  Heddes et al. ............................ 711/147
5,828,901  10/1998  O'Toole et al. ............................ 710/22

*Primary Examiner*—John A. Follansbee
*Attorney, Agent, or Firm*—Conley, Rose & Tayon; Jeffrey C. Hood

[57] ABSTRACT

An image acquisition apparatus, for acquiring frames of a video signal and storing these frames in a computer memory, is disclosed. An analog video input signal, comprising a sequence of video frames, is digitized by an A/D converter. The resulting digitized frames are selectively gated into a frame acquisition buffer. The frame acquisition buffer includes two or more memory segments, each configured to store a digitized video frame. A DMA controller transfers video frames from the frame acquisition buffer to the computer memory via a peripheral bus. Frame acquisition control logic (e.g. a second DMA controller) selects which video frames of the frame sequence are to be acquired into the frame acquisition buffer. The frame acquisition control logic and the DMA controller are coordinated by a status memory which contains a status flag for each memory segment. The frame acquisition control logic: checks a status flag to ensure that the corresponding memory segment is available before commanding the memory segment to be overwritten with a new video frame; and changes the status flag to indicate unavailability. The DMA controller updates a status flag to indicate availability when it finishes transferring the data contents of the corresponding memory segment. The frame acquisition control logic and the DMA controller operate concurrently.

29 Claims, 17 Drawing Sheets

Interaction Of The A/D Conversion Unit And The Second DMA Controller

Timing Diagrams In The Context Of A Free Bus Environment

Timing Diagrams In The Context Of A Congested Bus Environment

Timing Diagrams Where The Available Bus Bandwidth Exceeds The Average A/D Acquisition Rate

VIDEO CAPTURE DEVICE WITH ADJUSTABLE FRAME RATE BASED ON AVAILABLE BUS BANDWIDTH

BACKGROUND

The problem of acquiring video data into computer system memory (i.e. the main memory of a computer system) is increasingly the subject of attention in the field of image/video processing. As the performance of software image processing increases in response to improvements in CPU capacity, it is increasingly necessary to provide for fast and efficient acquisition of video frames from video source devices. Typical video sources include industrial cameras, camcorders, video cameras, VCRs, TV tuners, and laserdisk players.

Typically, a host computer system employs a video acquisition board to perform video frame acquisition. A video acquisition board is generally equipped with (a) an analog video port for coupling to an analog video source, (b) an A/D converter, (c) a frame acquisition buffer [RAM], (d) a bus connection to the host system, and (e) a DMA controller. In addition, a video board is often equipped with a digital video port for coupling to a digital video source.

An analog video source provides an analog video signal to the video board via the analog video port. The analog video signal is organized as a stream of video flames with a typical rate of 30 frames per second. The video board employs the A/D converter to digitize the analog video signal in response to synchronization information embedded in the analog video signal. The resulting digitized frame samples are temporarily stored in the frame acquisition buffer and then transferred to system memory.

A digital video source (e.g. a digital camera) provides a digital video signal to the video board via the digital video port. Since the digital video signal already comprises a stream of digitized video frames, the A/D converter (of the video board) is bypassed and frame data is stored directly into the frame acquisition buffer.

The frame acquisition buffer is generally large enough to prevent overrun of data as video data is received, stored, and transmitted to system memory. In some video acquisition boards, the frame acquisition buffer comprises only enough memory sufficient for buffering purposes, such as several Kilobytes. In other types of video acquisition boards, the frame acquisition buffer comprises enough storage for one or more digitized video frames. In these boards, the firame acquisition buffer is generally large enough to store several video frames in order to provide buffering of the bus connection to the host system.

In prior art acquisition systems, the host CPU controls the off-loading of the frame data from the frame acquisition buffer to the system memory. Accordingly, the host CPU must monitor the status of the frame acquisition buffer to determine which memory segments of the frame acquisition buffer contain newly acquired video frames. The host CPU must then command a DMA controller on the video acquisition board (or on the host) to transfer these memory segments to main memory, or must perform the transfer itself. The time consumed by the host CPU to perform this control task is time which detracts from other CPU processing tasks. For example, it is very likely that an image processing task such as feature detection, tracking, correlation, etc. is being performed on the video frame data that is being acquired. In addition, the CPU is often burdened with other tasks or processes.

Furthermore, it is very often the case that several peripheral devices share the bus which connects the video acquisition board to the host system. In this case the video acquisition board must compete with other peripherals for bus access to transfer data to the system memory. Also, the host system must compete with the video acquisition board as well as other peripherals devices for bus access in order to monitor and control the video acquisition board. Thus, in performing the monitor and control task, the CPU consumes valuable time, and also unnecessarily increases bus traffic.

It is obviously not efficient for the host CPU to be occupied with controlling the low-level task of data transfer while other time-intensive processing tasks await to be performed. Thus a system and method is desired whereby the acquisition of frame data into system memory can be controlled from within the video acquisition board, with minimal intervention by the host CPU. Such a system would liberate the host CPU to devote itself to higher-level processing tasks, and would also reduce bus traffic.

SUMMARY OF THE INVENTION

The present invention comprises a video capture system and method whereby frame acquisition into system memory is performed with minimal host CPU intervention. The acquisition of video frame data is performed in a manner that is transparent to the host CPU, and thus liberates the host CPU to concentrate on higher-level processing tasks. Furthermore, the system is characterized by its ability to automatically attain the maximum transfer rate possible in any peripheral bus environment, particularly in environments where the peripheral bus is shared with other devices. This advantage will become apparent in the description to follow.

The video capture system comprises a host computer coupled to a video source, such as a video camera. The host computer includes a CPU coupled to system memory (RAM) via a Bus Bridge. The host computer further includes a video capture board coupled to the Bus Bridge via a peripheral bus. The video source produces an analog or digital video signal which comprises a sequence of video frames. The video capture board includes (a) an analog video port coupled to receive the analog video signal from the video source, (b) an A/D conversion unit which digitizes the analog video signal to produce a sequence of digitized video frames, (c) a frame acquisition buffer which temporarily stores the digitized video frames until they can be off-loaded to system memory, (d) a first DMA controller designed to transfer digitized video frames to system memory via the peripheral bus, and (e) frame acquisition control logic (realized by a second DMA controller in the preferred embodiment) which commands the A/D conversion unit to acquire video frames into the buffer memory. The video capture board also preferably includes a digital video port for receiving digital data.

The A/D conversion unit includes a free-running A/D converter and an A/D controller. The A/D converter digitizes the analog video signal to produce a continuous stream of video samples. The A/D controller selectively gates this stream of video samples into the frame acquisition buffer. Namely, the A/D controller enables the stream to be written to the frame acquisition buffer (1) only for selected video frames, and (2) only during the infornation-bearing portions of the selected video frames. Thus, the A/D controller waits for a "start enable" signal from the fiame acquisition control logic to indicate that a video frame is to be acquired. Also, the A/D controller receives vertical and horizontal synch information (which is embedded in the analog video signal) to determine the active portions of video fields and scan lines.

In the case of a digital video signal, the video capture board includes supplemental control logic to perform the selective gating of digital video frames into the frame acquisition buffer. Systemically, the supplemental control logic function is similar to the A/D Control Unit except that no A/D conversion is performed since the digital video signal already provides frames in digital form. Hereinafter, references and descriptions to the functionality of the A/D Conversion unit as connected with an analog signal can be interpreted in terms of the supplemental control logic as connected with a digital video signal.

The frame acquisition buffer includes a memory controller and a buffer memory. The buffer memory comprises Random Access Memory which is organized into two or more memory segments each sufficient to store a digitized video frame. The memory controller controls read and write access to the buffer memory and causes the frame acquisition buffer to act like a First In First Out Buffer (FIFO) to external devices.

The first DMA controller reads video frame data from the frame acquisition buffer and transfers this data to system memory via the peripheral bus (subject to availability of the peripheral bus). In order to coordinate the action of the first DMA controller and the frame acquisition control logic, a status memory is maintained which stores information indicating the availability or unavailability of each of the memory segments in the buffer memory. The status memory is preferably maintained in system memory, or alternatively is maintained in a dedicated memory in the video capture board. The status memory stores a status flag for each of the memory segments in the buffer memory.

When the first DMA controller finishes transferring a video frame from a memory segment, that memory segment is said to be available (for overwriting with another video frame). When the A/D conversion unit starts to write a video frame into a memory segment, that memory segment is said to be unavailable, i.e., the frame currently being written must be off-loaded (by the first DMA controller) before the memory segment will be available again for overwriting. Whenever the first DMA controller finishes transferring a memory segment to system memory, the first DMA controller updates the corresponding status flag to indicate the availability of that memory segment, and then immediately begins to transfer the next memory segment.

The A/D conversion unit is configured to transfer digitized video frames into the frame acquisition buffer in response to control signals asserted by the frame acquisition control logic. In response to a start enable signal asserted by the frame acquisition control logic, the A/D conversion unit acquires a complete video frame into the buffer memory. The digitized video frame is written into one of the memory segments in the buffer memory.

The frame acquisition control logic checks the status memory to ensure the availability of a memory segment before commanding the A/D conversion unit to overwrite the memory segment via the start enable signal. Furthermore, upon asserting the start enable signal to the A/D conversion unit, the frame acquisition control logic updates the status memory to indicate the unavailability of the memory segment which is to be presently overwritten.

The buffer memory is cyclically overwritten with digitized video frame data, i.e. successive digital video frames are written into successive memory segments in the buffer memory, and the first memory segment succeeds the last memory segment in the cyclic topology of the buffer memory. Thus, the frame acquisition control logic cycles through the status memory, changing the value of status flags from the available state to the unavailable state as it commands the corresponding memory segments to be overwritten with new video frame data. The first DMA controller also cycles through the status memory changing the value of status flags from the unavailable state to the available state as it finishes transferring the contents of corresponding memory segments to system memory. Since the A/D acquisition of video frames and off-loading of video frames (to system memory) are performed in parallel, a considerable increase in data transfer rate is realized in the present invention. Thus a dynamic equilibrium is achieved wherein the frame acquisition control logic continuously overwrites memory segments with new video frames while the first DMA controller continuously liberates memory segments (for further overwriting) by off-loading their video frame contents to system memory. Furthermore, since the concurrent frame acquisition and off-loading are performed without host CPU intervention, peripheral bus bandwidth is conserved for actual data transfers to system memory, and the host CPU is free to pursue higher level processing tasks.

If the average available bandwidth on the peripheral bus is larger than the net A/D acquisition rate into the frame acquisition buffer, then the video capture board will acquire into system memory every frame of the video signal, provided the frame capacity of the buffer memory is large enough to accommodate short-term fluctuations in available bus bandwidth. Furthermore, since the first DMA controller is continuously driving DMA transfer of video frame data to system memory, the present invention is able to dynamically achieve a transfer rate equal to the available PCI bandwidth.

BRIEF DESCRIPTION OF THE DRAWINGS

A better understanding of the present invention can be obtained when the following detailed description of the preferred embodiment is considered in conjunction with the following drawings, in which.

Figure 1:
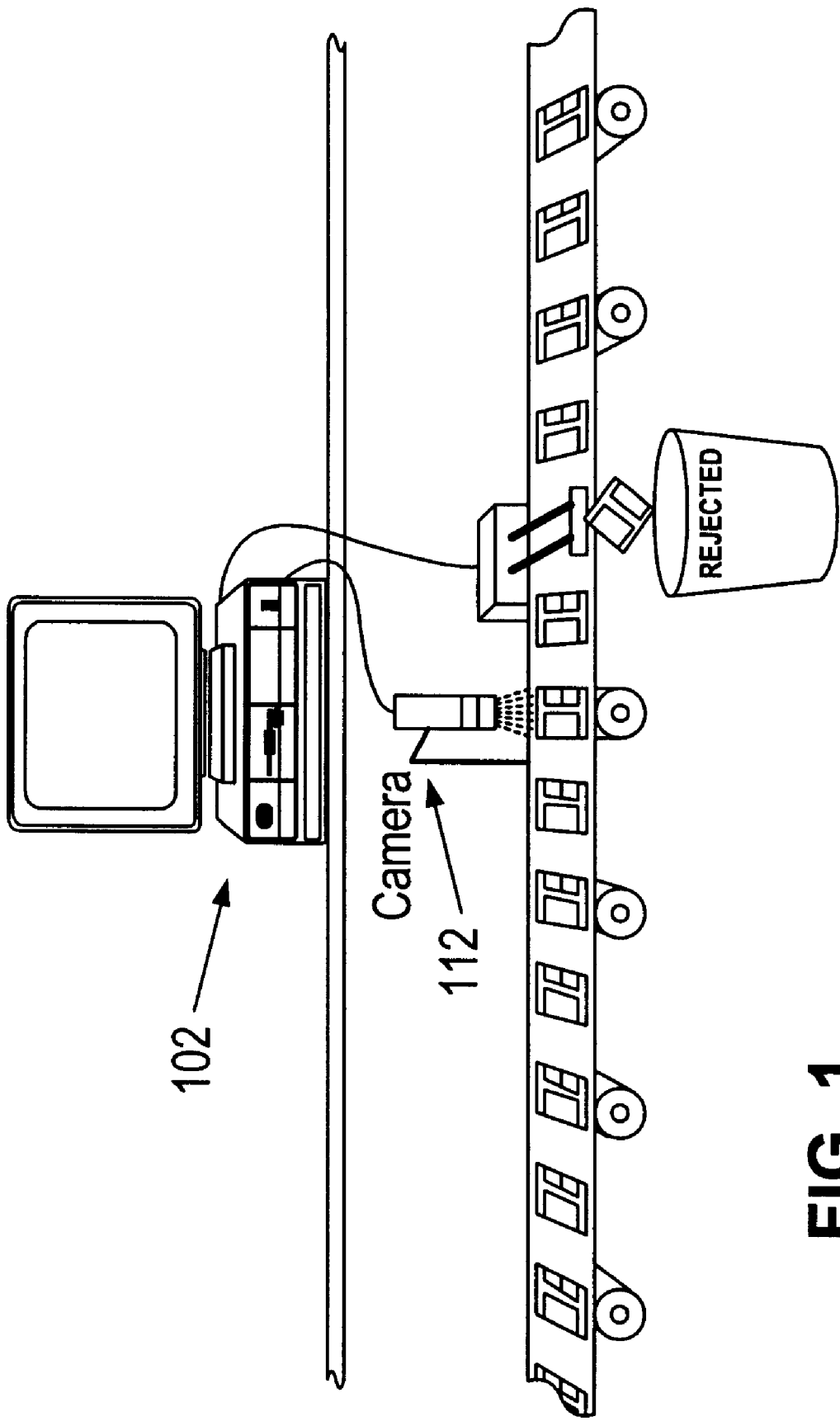
FIG. 1 is an illustration of a video capture system according to the preferred embodiment of the present invention is presented.

While the invention is susceptible to various modifications an alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Video Capture System

Referring now to FIG. 1, an illustration of a video capture system according to the preferred embodiment of the present invention is presented. The video capture system comprises a host computer 102 and a video source 112. The video source 112 produces an analog or digital video signal which comprises a sequence of video frames, or other data desired to be acquired. The analog or digital video signal is provided to the host computer 102 for storage and/or processing.

Video Capture System Block Diagram

Figure 2:
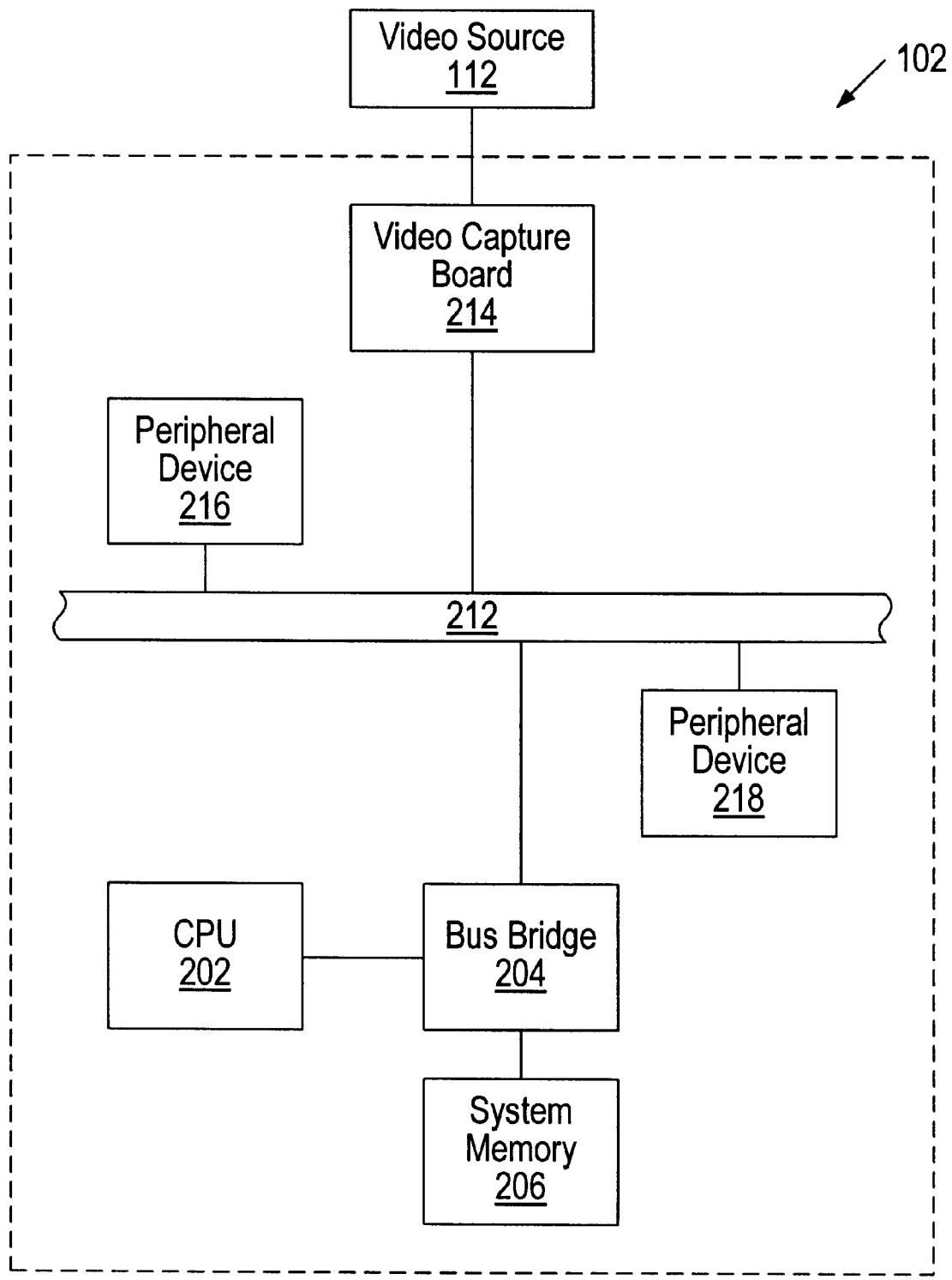
FIG. 2 is a high-level block diagram of the video capture system according to the present invention.

Referring now to FIG. 2, a high-level block diagram of the video capture system according to the present invention is presented. It is noted that the block diagram of FIG. 2 is exemplary only, and other computer system architectures may be used as desired. The host computer 102 comprises a CPU 202, a Bus Bridge 204, system memory 206, and a peripheral bus 212. The CPU 202 is coupled to the Bus Bridge 204. The Bus Bridge 204 is coupled to the system memory 206, and couples to the peripheral bus 212. In the preferred embodiment, the peripheral bus 212 is the PCI expansion bus. However, it is noted that other types of buses may be used. The host computer system also includes a video capture board 214 which is adapted for coupling to the video source 112. The video capture board 214 is coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog video signal to the video capture board 214. It is noted that the video source 112 may supply a digital video signal directly to the video capture board 214. Where the video capture board receives an analog signal, the video capture board 214 digitizes the analog video signal to produce a stream of digitized video frames. The video capture board 214 temporarily stores the digitized video frames until it can arrange for transfer to the system memory 206 through peripheral bus 212 and Bus Bridge 204. Since the video capture board 214 controls the transfer of digitized video frames to the system memory 206, the CPU 202 is free to perform other processing tasks such as image analysis and recognition, or other applications.

Video Capture Board

Figure 3:
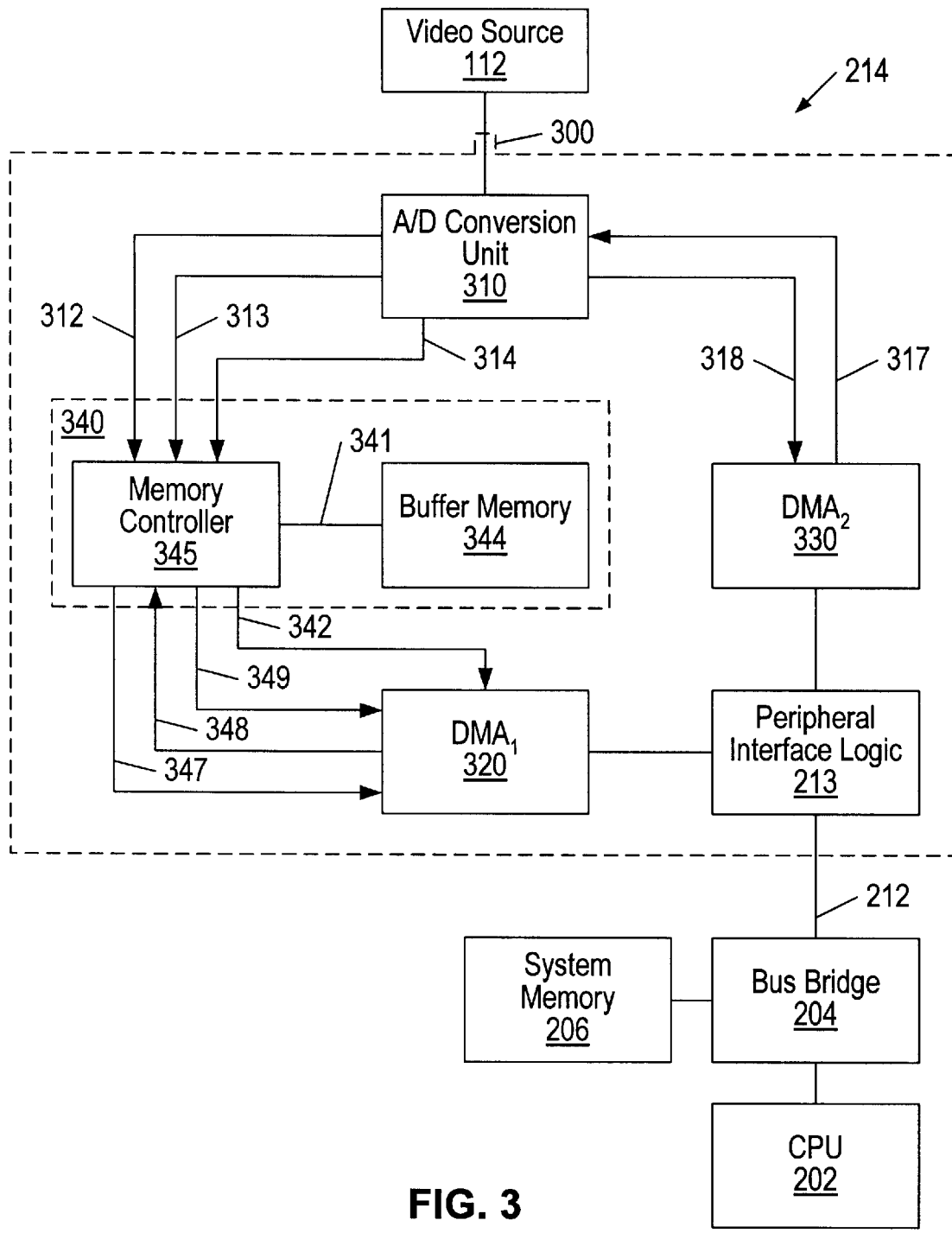
FIG. 3 is a more detailed block diagram of the video capture board 214 according to the present invention.

Referring now to FIG. 3, a more detailed block diagram of one embodiment of the video capture board 214 is shown. The video capture board 214 comprises an analog video port 300, an A/D conversion unit 310, and a frame acquisition buffer 340. The frame acquisition buffer 340 comprises buffer memory 344 and memory controller 345. Buffer memory 344 preferably comprises Random Access Memory (RAM). The video capture board 214 further includes a first DMA controller 320, frame acquisition control logic (a second DMA Controller) 330, and peripheral bus interface logic 213. In the preferred embodiment, the frame acquisition control logic 330 comprises a second DMA controller. Hereinafter, the frame acquisition control logic 330 will be referred as the second DMA controller 330.

1. Video Port

The analog video port 300 is coupled to the A/D conversion unit 310. The A/D conversion unit 310 is coupled to the memory controller 345 preferably via a write data bus 312, a write strobe line 313, and a write enable line 314. The A/D conversion unit 310 is coupled to the second DMA controller 330 via a start enable line 317 and a done request line 318. The memory controller 345 is coupled to buffer memory 344 via address/data bus 341. The memory controller 345 is coupled to the first DMA controller 320 via a read data bus 342, a read request line 347, an acknowledge line 348, and a data transfer acknowledge line 349. The first DMA controller is coupled to the peripheral bus interface logic 213. The second DMA controller 330 is also coupled to the peripheral bus interface logic 213. The peripheral bus interface logic 213 is coupled to the peripheral bus 212.

2. Video Source

The video source 112 (e.g. a video camera) produces an analog video signal. The analog video signal is organized as a stream of video frames. The frame rate is typically 30 Hz. The video source 112 generates a video frame by scanning a source image, typically with 480 horizontal scan lines. However, since the odd numbered and even numbered scan lines are scanned in two separate passes, a video frame is composed of an odd field and an even field, where each field comprises 240 scan lines. The beginning of each field is signaled by the assertion of a vertical synchronization pulse, and the beginning of each scan line is signaled by the assertion of a horizontal synchronization pulse.

Figure 4:
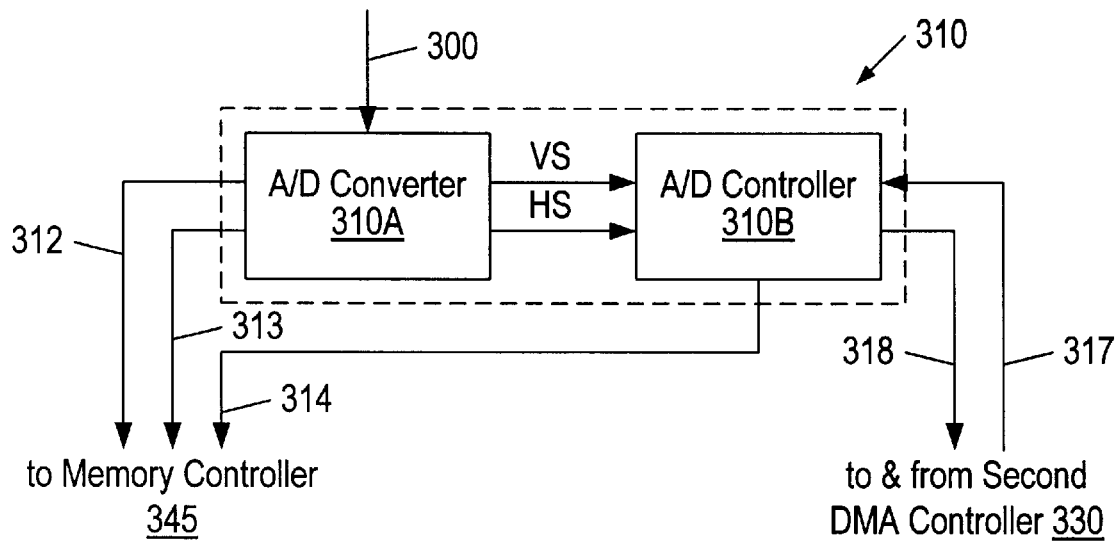
FIG. 4 is refined block diagram of the A/D conversion unit 310 according to the present invention.

The video source 112 is coupled to analog video port 300, and provides the video capture board 214 with an analog video input signal. The analog video input signal is fed, after perhaps some signal conditioning, to the A/D conversion unit 310 for sampling. Please refer now to FIG. 4 which illustrates a refinement of the A/D conversion unit 310. The A/D conversion unit 310 comprises an A/D converter 310A and an A/D controller 310B. In the preferred embodiment, the A/D controller is realized in a Field Programmable Gate Array (FPGA). The A/D converter 310A is free-running (i.e. continuously samples the analog video input signal with a predetermined sample rate). The resulting video samples are continuously asserted onto write data bus 312. To facilitate the timing of write accesses to memory controller 345, the A/D converter 310A is further coupled to memory controller 345 via write strobe line 313. The A/D converter 310A asserts a pulse on write strobe line 313 for each video sample asserted on write data bus 312. However, video samples are received by memory controller 345 only when write enable line 314 is asserted. When write enable line 314 is asserted, the rising edge of a pulse asserted on write strobe line 313 causes memory controller 345 to latch data from write data bus 312. The memory controller 345 stores the received data into buffer memory 344 via address/data bus 341.

3. A/D Converter

The A/D converter 310A is coupled to the A/D controller 310B by a vertical synch line (VS) and a horizontal synch line (HS). The A/D converter 310A separates the vertical synch pulses from the analog video input signal and provides these to the A/D controller 310B via the vertical synch line VS. Also, the A/D converter 310A separates the horizontal synch pulses from the analog video input signal and provides these to the A/D controller 310B via the horizontal synch line HS. The A/D controller 310B is coupled to the memory controller 345 via write enable line 314. The A/D controller 310B is coupled to the second DMA controller 330 via a start enable line 317 and a done request line 318.

The A/D controller 310B controls the state of vrite enable line 314 and thereby determines whether or not video samples are acquired into the frame acquisition buffer 340. The A/D controller 310B asserts write enable line 314 (a) only during selected video frames, and (b) only during the infornation-bearing portions of the selected video frames. A video frame is selected for acquisition by a start enable signal asserted by the second DMA controller 330 via start enable line 317. The information-bearing portions of a selected video frame are determined from the vertical and horizontal synch pulses conveyed via the VS and HS lines respectively. The processing loop of the A/D controller 310B comprises the following steps: (a) wait for a start enable pulse asserted by the second DMA controller 330 via start enable line 317; (b) when a start enable pulse is received, acquire the next received video frame into the frame acquisition buffer 340; (c) when the video frame has been acquired, i.e. all 480 scan lines have been acquired into the frame acquisition buffer 340, send a done request signal to the second DMA controller 330; (d) reiterate starting with step (a).

In step (b) above, the received video frame is acquired into the frame acquisition buffer 340 by asserting the write enable line 314 during the information-bearing portions of the analog video input signal, i.e. when the vertical and horizontal synch pulses are de-asserted. More generally, note that if a start enable pulse is not asserted by the second DMA controller 330, then video frames are not acquired into the frame acquisition buffer 340.

4. The Frame Acquisition Buffer

The operation of the frame acquisition buffer 340 will now be described in detail. The frame acquisition buffer 340 comprises a buffer memory 344 coupled to a memory controller 345 via an address/data bus 341. The buffer memory 344 contains sufficient storage for a plurality of video frames. In the preferred embodiment, a video frame comprises 480 scan lines each with 640 samples. If each video sample occupies a single memory location of buffer memory 344, the storage of a video frame would require 300 K (=480×640) storage locations. In the preferred embodiment of the invention, the buffer memory has a storage capacity equal to a multiple of 512 K storage locations. Thus, the buffer memory is comprised of a plurality of 512 K memory segments. Video frames are stored in the first 300 K locations of a memory segment.

Figure 5:
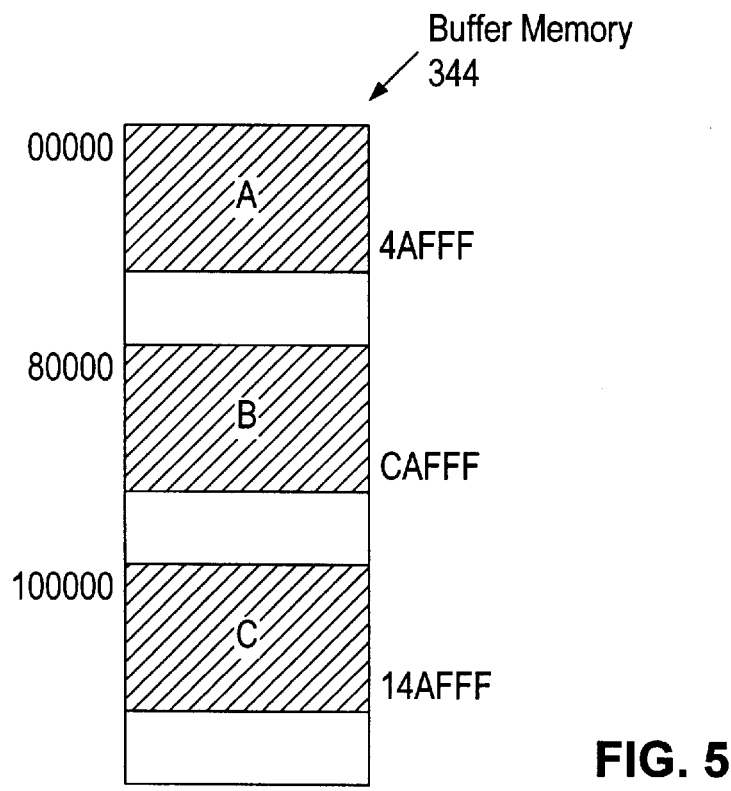
FIG. 5 illustrates the organization of buffer memory 344 according to the present invention.

Please refer to FIG. 5 for an illustration of the organization of buffer memory 344. In FIG. 5, buffer memory 344 is illustrated with three memory segments. Since each memory segment corresponds to 512 K storage locations, the starting addresses of the memory segments in hexadecimal are 00000, 80000, and 100000. The shaded regions A, B, and C denote three stored video frames. Note that each video frame occupies the first 300 K storage locations of a memory segment. Thus, for example the last memory location of video frame A has hexadecimal address 4AFFF. The last memory locations of video frames B and C are respectively CAFFF and 14AFFF. Since stored video frames are aligned along the 512 K memory segment boundaries, address calculations are simplified.

The memory controller 345 causes the buffer memory 344 to act like a First In First Out Buffer (FIFO). The memory controller 345 maintains a read pointer and a write pointer to identify the current location of read access and write access to the buffer memory 344. Each write transaction by the A/D conversion unit 310 causes the write pointer to be incremented. Each read transaction by the first DMA controller 320 causes the read pointer to be incremented. When either pointer reaches a location indicating the last sample of a video frame, incrementing the pointer causes it to point to the first location of the next memory segment. For example, in FIG. 5, when the read pointer reaches location 4AFFF, incrementing the read pointer causes it to point to location 80000, i.e. the first location of the second memory segment. Furthermore, the buffer memory 344 has a cyclic topology. Thus, when either pointer reaches the location 14AFFF, indicating the last location of the last video frame, incrementing the pointer causes it point to location 00000, i.e. the first location of the first memory segment.

For write access to the frame acquisition buffer 340, the A/D conversion unit 310 asserts a write enable signal on the write enable line 314. While the write enable signal is asserted, the memory controller 345 latches a video sample from the write data bus 312 on the rising edge of every pulse asserted on the write strobe line 313. When a video sample is latched, the memory controller 345 writes the video sample into the buffer memory 344 via the address/data bus 341. The video sample is written to the buffer memory location given by the current value of the write pointer. After the video sample has been written into the buffer memory 344, the write pointer is incremented.

Since the memory controller 345 is designed to enable the buffer memory 344 to act like a FIFO, the write pointer always has an address value greater than or equal to the read pointer. To ensure this, the memory controller 345 selectively asserts or de-asserts a read request signal on the read request line 347. An assertion of the read request signal on the read request line 347 serves as a request to the first DMA controller 320 to start reading data from the frame acquisition buffer 340. The first DMA controller 320 does not read data from the frame acquisition buffer 340 unless the read request signal is asserted. The memory controller 345 maintains a comparison of the read pointer and the write pointer. If the read pointer and write pointer are not equal, the memory controller 345 asserts a read request signal on the read request line 347, and maintains this assertion until the read and write pointers become equal. Thus, read accesses are allowed only if the read pointer lags behind the write pointer.

5. The First DMA Controller

The first DMA controller 320 is responsible for reading video data from the frame acquisition buffer 340 and transferring the video data to system memory 206. As discussed above, the first DMA controller 320 does not read data from the frame acquisition buffer 340 if the read request signal is not asserted. However, supposing the read request signal is asserted, read access to the frame acquisition buffer 340 proceeds as follows: (a) the first DMA controller asserts an acknowledge signal on the acknowledge line 348 indicating that it is ready to receive data; (b) the memory controller 345 accesses the buffer memory location corresponding to the read pointer and asserts the data contents on read data bus 342; (c) the memory controller 345 increments the read pointer; (d) the memory controller 345 asserts a signal on the data transfer acknowledge line 349 indicating that data is available on the read data bus 342; (e) the first DMA controller 320 responds to the signal on the data transfer acknowledge line 349 by latching the data from read data bus 342 on the next rising clock edge. Furthermore, as long as the acknowledge signal continues to be asserted on the acknowledge line 348, steps (b) through (e) are performed repeatedly.

Figure 6:
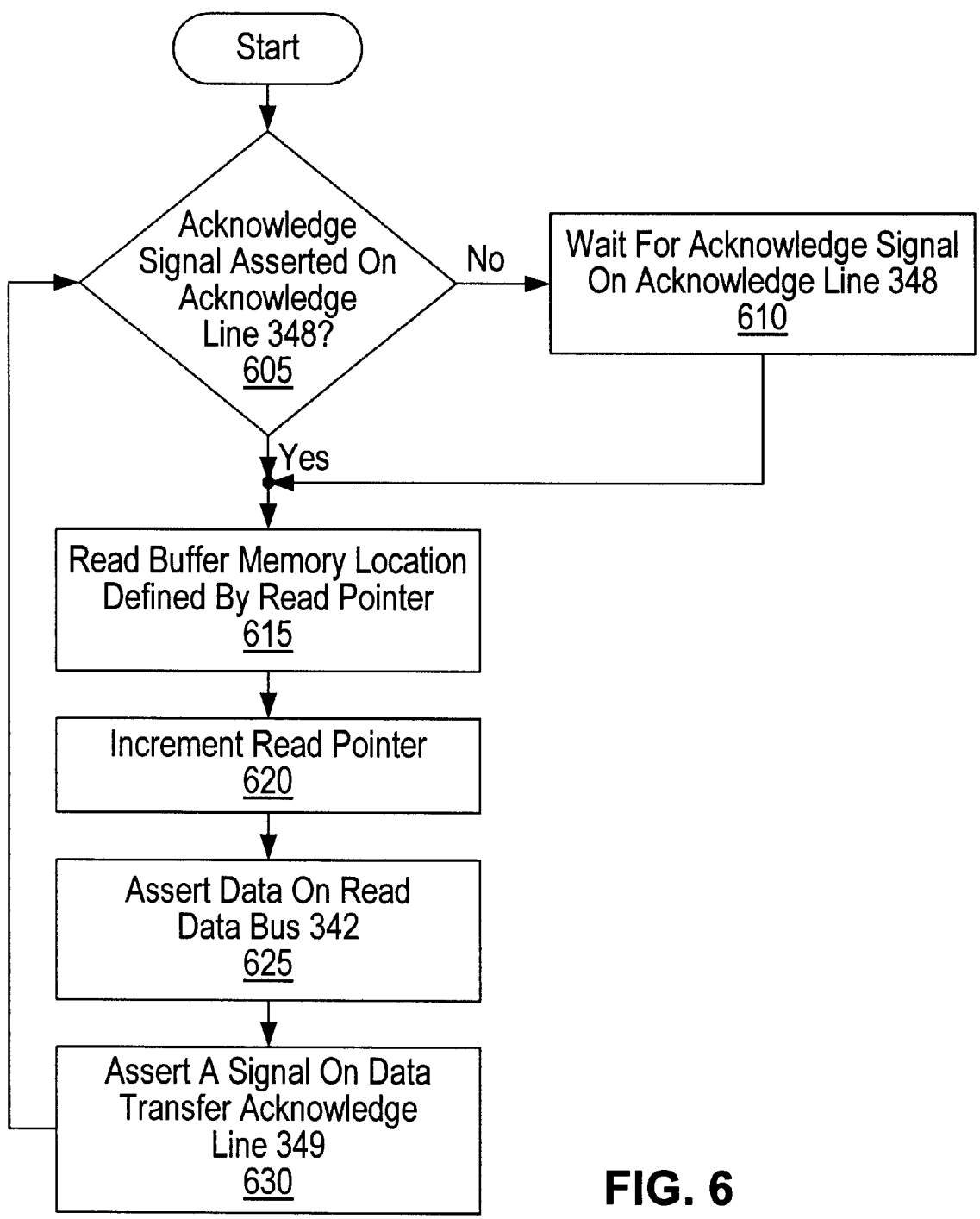
FIG. 6 is a flowchart for the read processing loop of the memory controller 345 according to the present invention.

Referring now to FIG. 6, a flowchart for the read processing loop of the memory controller 345 is shown. The first step 605 of the read processing loop is to test the state of the acknowledge line 348. If an acknowledge signal is asserted on the acknowledge line 348, step 615 is performed immediately. However, if the acknowledge signal is not asserted on the acknowledge line 348, the memory controller 345 waits for the assertion of the acknowledge signal before proceeding to step 615. [The waiting comprises step 610.] In step 615, the memory controller 345 reads the location in buffer memory 344 defined by the current value of the read pointer. In step 620, the read pointer is incremented. In step 625, the data read from buffer memory 344 is asserted on read data bus 342. In step 630, the memory controller 345 asserts a signal on the data transfer acknowledge line 349. Then the loop reiterates starting with step 605.

6. The Second DMA Controller and Status Memory

The second DMA controller 330 commands the A/D conversion unit 310 to acquire video frames (into the frame acquisition buffer 340) depending on status information, which is preferably stored in system memory 206. In particular, the second DMA controller 330 must verify the availability of a memory segment (in buffer memory 344) before commanding the A/D conversion unit 310 to overwrite the memory segment with new video data. A memory segment is said to be available for overwriting (by the A/D conversion unit 310) as soon as the first DMA controller 320 finishes reading the last stored video sample from the memory segment.

In FIG. 5, suppose that the first DMA controller 320 is reading the second memory segment in the buffer memory 344. When the first DMA controller 320 finishes reading the last sample of video frame B (stored in the second memory segment), given by address CAFFF, the second memory segment is said to be available for overwriting. When a first video frame is written into a memory segment, that memory segment should not be overwritten with a subsequent video frame until the first DMA controller 320 has finished reading the first video frame. Thus a memory segment is said to be unavailable for overwriting the moment its first location is written to by the A/D conversion unit 310.

Figure 7:
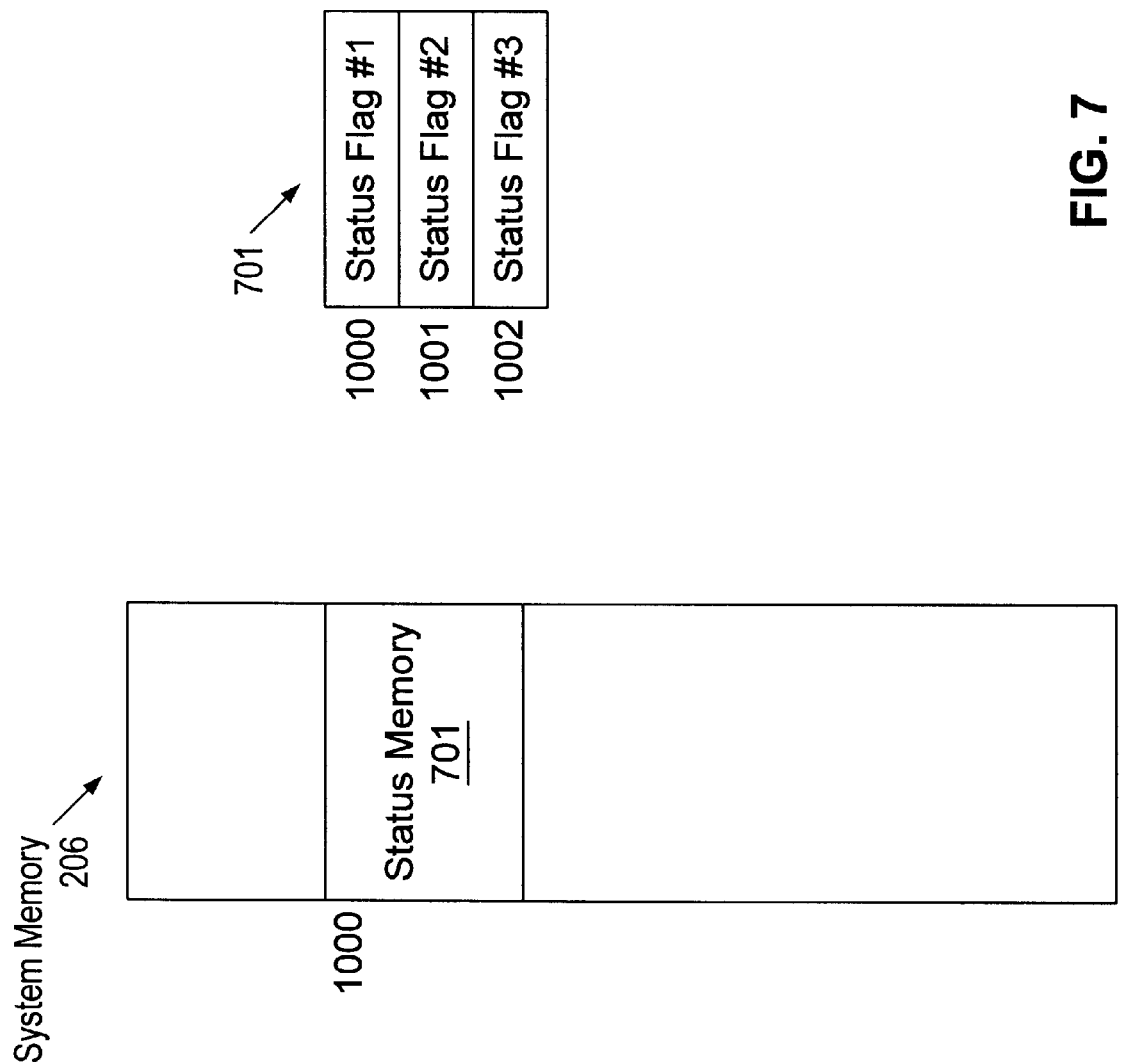
FIG. 7 is a diagram of the organization of status memory 701 within system memory 206 according to the present invention.

The first DMA controller 320 reads memory segments via read data bus 342, while the second DMA controller 330 concurrently commands the A/D conversion unit 310 to fill (write) memory segments with new digitized video frames. In order to coordinate the operation of the first DMA controller 320 and the second DMA controller 330, a portion of system memory 206 is preferably reserved for storing availability information for each of the memory segments in buffer memory 344. Alternatively, the availability information may also be stored in on-board memory. The term "status memory" thus refers to this reserved portion of system memory 206 (or on-board memory). Please refer to FIG. 7, for a diagram of the organization of status memory 701 within system memory 206. The status memory 701 is depicted with three status flags, StatusFlag#1, StatusFlag#2, and StatusFlag#3, starting at system memory address 1000. The status memory 701 contains one status flag for each of the memory segments in the frame acquisition buffer 340. A status flag takes the value READY if the corresponding memory segment is available for overwriting, and the value NOT_READY if the corresponding memory segment is unavailable for overwriting.

Operation Overview

The first DMA controller 320 transfers the contents of memory segments in the frame acquisition buffer 340 to system memory 206. Thus, the first DMA controller 320 operates by reading video samples from the frame acquisition buffer 340 via read data bus 342, and then writing the video samples to system memory 206 via the peripheral bus interface logic 213. When the first DMA controller 320 finishes transferring a complete video frame from a memory segment to the system memory 206, the first DMA controller 320 sets the corresponding status flag (in the status memory 701) to the value READY, and then starts transferring video data from the next memory segment. As mentioned above, the second DMA controller 330 must verify the availability of a memory segment before commanding the A/D conversion unit 310 to overvrite the memory segment with a new video frame. The second DMA controller 330 checks the availability of a memory segment by reading the corresponding status flag in the status memory 701. If the status flag takes the value READY, indicating that the video data in this segment has already been transferred to system memory 206, then the memory segment is available for new data. If the status flag takes the value NOT_READY, indicating that the video data in this segment has not yet been off-loaded to system memory 206, the second DMA controller 330 will wait until the status flag changes to the value READY before commanding the A/D conversion unit 310 to overwrite the memory segment.

Each time the first DMA controller 320 attempts to transfer data to system memory 206, it must arbitrate for control of the peripheral bus 212 via peripheral bus interface logic 213. In the host computer system, it is assumed that there are other peripheral devices connected to the peripheral bus 212 actively attempting their own data transfers. Thus it will quite often be the case that when the first DMA controller 320 attempts to write data to system memory 206, it will have to wait for bus availability. While the first DMA controller 320 is waiting for bus availability, the A/D conversion unit 310 continues to write video data into the frame acquisition buffer 340. If the peripheral bus environment is relatively free (uncluttered), the average available bus bandwidth will exceed the average data rate of the video input signal (for most video sources). Thus, the A/D conversion unit 310 will acquire into the frame acquisition buffer 340 every frame of the source video sequence, and the first DMA controller 320 will transfer each of these frames to system memory 206, provided the frame capacity of buffer memory 344 is large enough to accommodate short-term fluctuations in available bus bandwidth.

However, if the peripheral bus environment is congested by competing traffic, the average available bus bandwidth will be smaller than the average data rate of the video input signal. In terms of the read and write pointers mentioned above, the read pointer, representing the current position of read access by the first DMA controller 320, moves slowly due to the low available bus bandwidth. However, the write pointer, representing the current position of write access by the A/D conversion unit 310 moves much more quickly. In fact, the write pointer moves at an average rate equal to the average data rate of the analog video input signal. For a typical video source, this data rate equals (30 frames/sec)× (480 scan lines/frame)×(640 pixels/line). Eventually the write pointer will wrap around the buffer memory 344 and would overrun the read pointer if allowed to do so. The write pointer is prevented from overrunning the read pointer by the status mechanism described above: by reading the status flags in status memory 701, the second DMA controller 330 determines when the next memory segment is unavailable (i.e. the data in that memory segment has not yet been off-loaded by the first DMA controller 320), and terminates frame acquisition by withholding the start enable signals from the A/D conversion unit 310. This prevents write access by the A/D conversion unit 310 from running over read access by the first DMA controller 320. Thus if the average available bus bandwidth is smaller than the average A/D acquisition rate, the system will eventually reach the state where all memory segments are unavailable (i.e. awaiting transfer by the first DMA controller 320), and A/D frame acquisition terminates. In this case, video frames from the analog source are lost. However, since the read pointer is behind the write pointer (in fact, maximally behind—by a distance equal to the capacity of buffer memory 344), the read request signal is still being asserted. Thus, the first DMA controller 320 will continue to read data from the frame acquisition buffer 340. When the first DMA controller finishes transferring a video frame from one of the memory segments, the second DMA controller will resume video frame acquisition (by asserting the start enable pulse).

Figure 8:
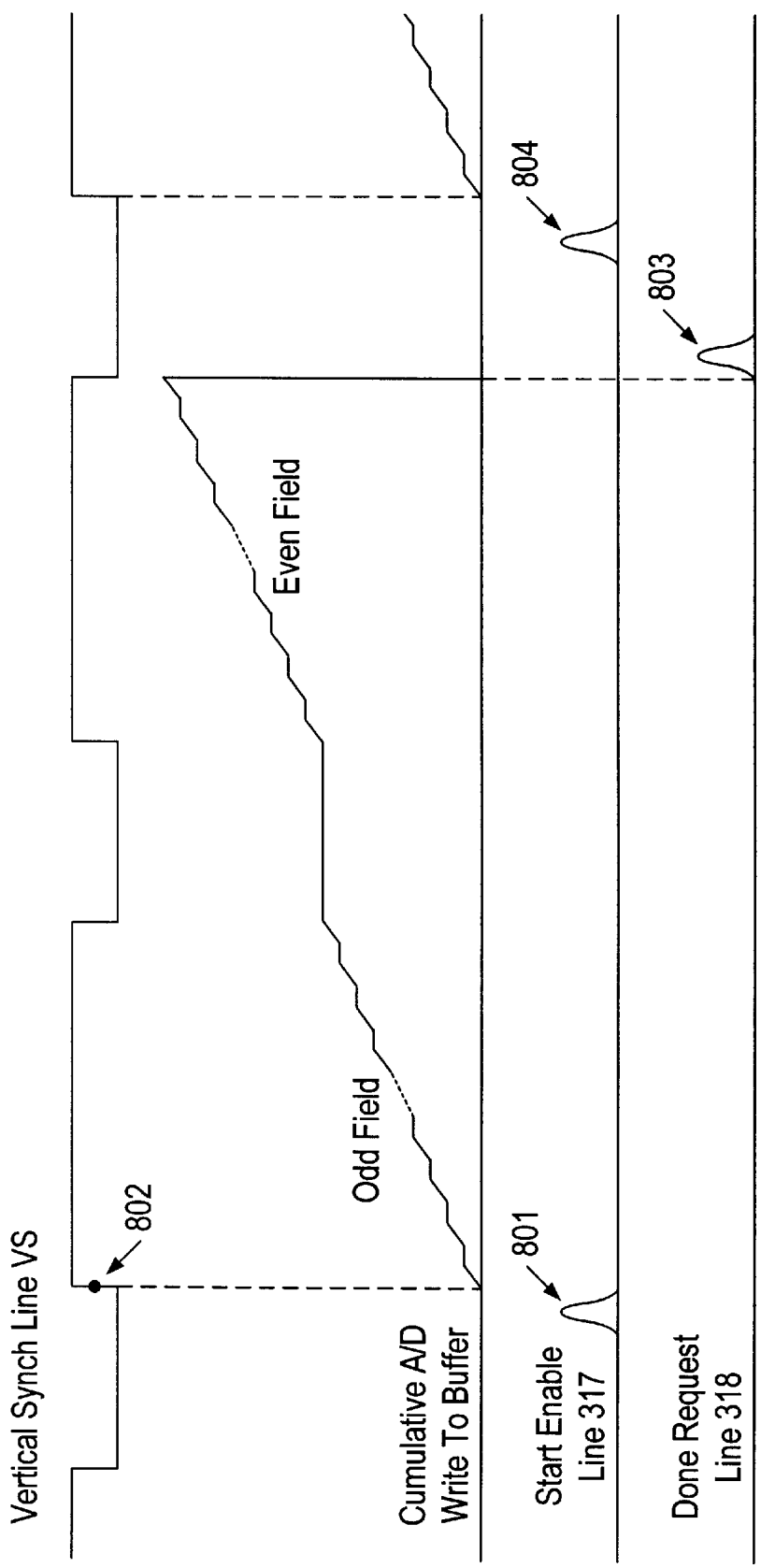
FIG. 8 provides timing diagrams which illustrate the behavior of the A/D converter 310 in conjunction with the second DMA controller 330 according to the present invention.

FIG. 8: Interaction of the A/D Conversion Unit and the Second DMA Controller

Referring now to FIG. 8, timing diagrams which illustrate the behavior of the A/D conversion unit 310 in conjunction with the second DMA controller 330 are provided. The start of each video field (odd or even) is signaled by the trailing edge of a vertical synch pulse on the vertical synch line VS. Recall that the A/D converter 310A separates and provides the vertical synch pulse to A/D controller 310B via the vertical synch line VS line (of FIG. 3). The beginning of a frame is signaled by the assertion of an odd-field vertical synch pulse. However the acquisition of a video frame does not occur if the A/D conversion unit 310 has not been enabled by the second DMA controller 330. The second DMA controller 330 enables the A/D conversion unit 310 to acquire a video frame by sending a start enable signal via start enable line 317. Notice in FIG. 8 that the start enable signal 801 precedes the trailing edge 802 of the odd-field vertical synch pulse.

The diagram labeled Cumulative A/D Write to Frame Acquisition Buffer 340 illustrates cumulative transfer of the samples of a video frame from the A/D conversion unit 310 to the frame acquisition buffer 340. Observe that the cumulative transfer trace for a video frame resembles a staircase. This is because the video frame is composed of 480 horizontal scan lines and the A/D controller 310B disables write access to the frame acquisition buffer while horizontal synch pulses are asserted on the horizontal synch line HS (not shown).

Also, the A/D conversion unit 310 is coupled to the second DMA controller 330 via done request line 318. When the A/D conversion unit 310 is finished acquiring a video frame, it sends a done request signal 803 to the second DMA controller 330 via done request line 318, requesting to be enabled for sampling the next video frame. In the short time [typically 180 microseconds] between the end of a video frame and the beginning of the next video frame, the second DMA controller 330 must: (a) receive the done request signal from A/D conversion unit 310, (b) consult the status memory 701 to determine if the next memory segment in buffer memory 344 may be overwritten with new data, and if so (c) send an enable signal 804 to the A/D conversion unit 310 via start enable line 317. If an enable signal is not sent to the A/D conversion unit 310, the next video frame will not be acquired.

In response to receiving the done request signal from the A/D conversion unit 310, the second DMA controller 330 reads the status memory 701 to determine if the next memory segment in the frame acquisition buffer 340 is available for overwriting. In particular, if the status flag for the next memory segment takes the value READY, the second DMA controller 330 sends an enable signal to the A/D conversion unit 310 via the start enable line 317, thereby commanding the A/D conversion unit 310 to acquire the next video frame into the frame acquisition buffer 340.

Figure 9:
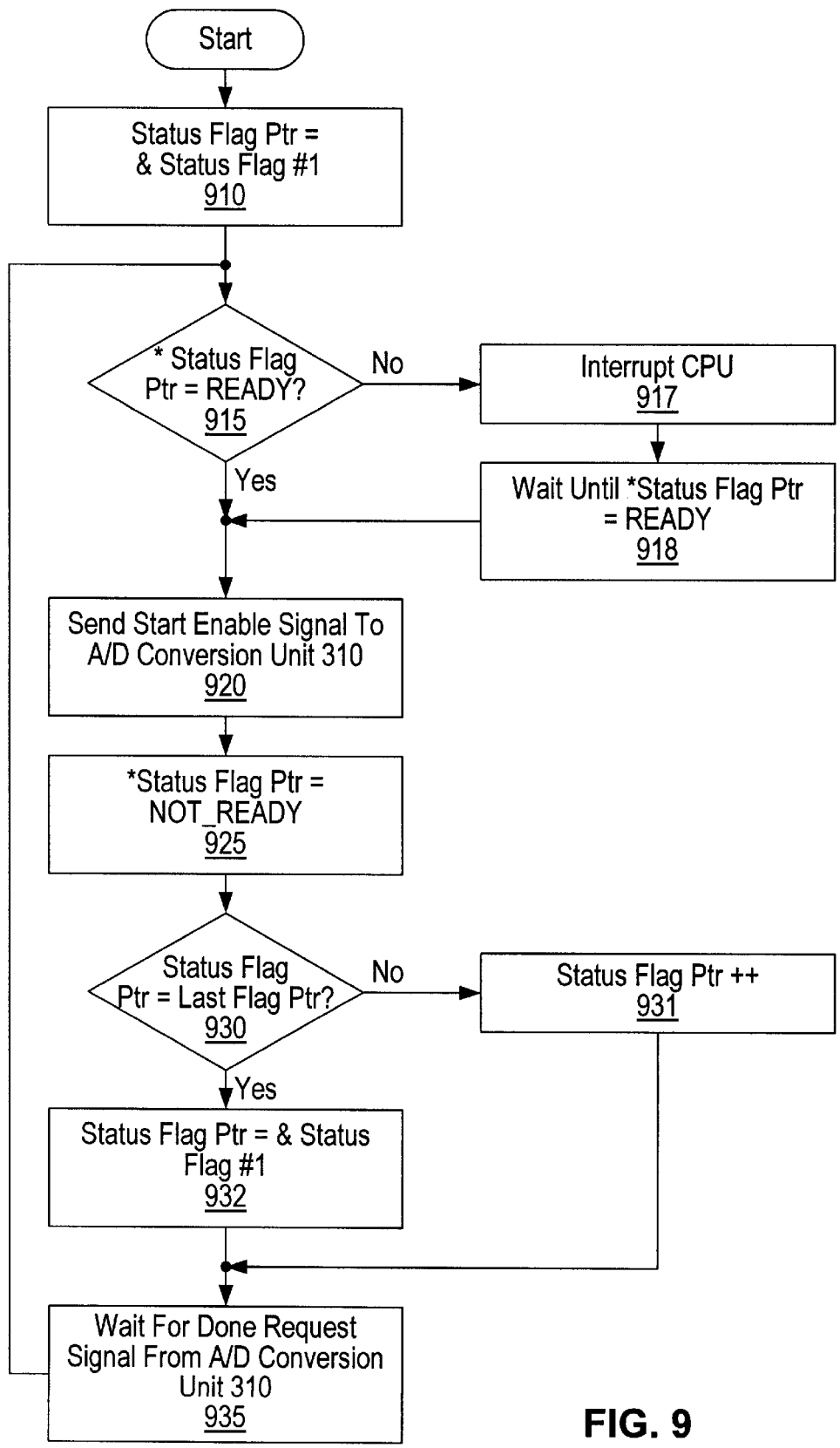
FIG. 9 is a flowchart of the processing loop executed by the second DMA controller 330 according to the present invention.

FIG. 9: The Second DMA Controller Processing Loop

At the start of system operation, the status memory 701 is initialized so that all status flags are set to the READY value. Referring now to FIG. 9, a flowchart of the processing loop executed by the second DMA controller 330 is illustrated. In step 910, a pointer StatusFlagPtr, which points to a status flag in status memory 701, is initialized with the address &StatusFlag#1 of the first status flag. Recall, the first status flag corresponds to the first memory segment in buffer memory 344. In step 915, the second DMA controller 330 tests the current status flag, i.e. the status flag pointed to by StatusFlagPtr and denoted as *StatusFlagPtr. If the current status flag takes the value READY, then step 920 is performed immediately.

However, if the current status flag takes the value NOT_READY, then steps 917 and 918 are performed before step 920. In step 917, an interrupt is sent to the CPU 202. In step 918, the second DMA controller 330 waits until the current status flag changes to the value READY. When the current status flag changes to the READY value, due to the read activity of the first DMA controller 320, processing resumes with step 920. The interrupt sent to the CPU in step 917 above indicates that all memory segments are in the unavailable (NOT_READY) state. This will become clear in the discussion to follow.

In step 920, the second DMA controller 330 sends a start enable signal to the A/D conversion unit 310. In step 925, the current status flag is set to the value NOT_READY [because the corresponding memory segment will presently be overwritten in response to the start enable signal, and require off-loading]. In step 930, a conditional branch operation is performed based on the value of the pointer StatusFlagPtr. If the StatusFlagPtr points to the last status flag in status memory 701, i.e. takes the value LastPtr, then step 932 is performed before step 935. In step 932, the StatusFlagPtr is updated with the address &StatusFlag#1 of the first status flag. The updating comprises step 932.

If, on the other hand, the pointer StatusFlagPtr does not equal LastPtr, then step 931 is performed before step 935. In step 931, the pointer StatusFlagPtr is incremented.

In step 935, the second DMA controller 330 waits for the done request signal from the A/D conversion unit 310 via the done request line 318. When the done request signal is received from the A/D conversion unit 310, the processing loop continues with step 915.

As described above, read access to the frame acquisition buffer 340 by the first DMA controller 320 follows write access by the A/D conversion unit 310. The second DMA controller 330 cycles through the status memory 701 changing the value of status flags from READY to NOT-READY as it commands the A/D conversion unit 310 to fill the corresponding memory segments with video frames. The first DMA controller 320 also cycles through the status memory 701, behind the second DMA controller 330, changing the value of status flags from NOT-READY to READY as it finishes transferring the corresponding memory segments to system memory 206.

If the peripheral bus environment is free and unhindered, the first DMA controller 320 is able to empty memory segments as they are being filled by the A/D conversion unit 310. Thus the second DMA controller 330 will never read a status flag with the value NOT-READY, and the system will acquire into system memory 206 every frame of the analog video input signal.

In order to direct its transfer activity, the first DMA controller 320 consults a portion of system memory 206 reserved for storing DMA control information. This reserved portion of system memory 206 will hereinafter be referred to as the DMA control list. The DMA control list comprises a linked list of transfer structures. A transfer structure comprises a TransferCount, a TransferAddress, and NextPtr. The TransferAddress field contains an integer value in the range 0 through FFFFFFF hexadecimal. A transfer structure is interpreted in several different ways depending upon the value of the TransferCount field. The TransferAddress field points to a location in system memory 206. The NextPtr is a pointer to the next transfer structure in the DMA control list.

When the TransferCount field takes a value in the range 1 through FFFFFFE inclusive, the first DMA controller 320 interprets the TransferCount and TransferAddress fields as a DMA transfer command. Thus, the first DMA controller 320 reads exactly TransferCount locations from the frame acquisition buffer 340 and transfers the corresponding data to system memory 206 starting at the address given by TransferAddress. When the first DMA controller 320 has finished this DMA transfer operation, it uses the NextPtr field to access the next transfer structure in the DMA control list.

Recall that each video frame stored in the frame acquisition buffer 340 comprises 300 K storage locations. Thus, the transfer of a complete video frame to system memory 206 could be supported by one transfer structure (DMA transfer command). The TransferCount field would equal 300 K, and the TransferAddress field would point to a reserved block of system memory 206 with 300 K contiguous locations. However, in the preferred embodiment of the invention, the transfer of a video frame to system memory 206 is arranged with 480 separate transfer structures (DMA transfer commands), one for each of the 480 scan lines in the video frame. Thus, the TransferCount field for a scan line transfer would equal 640.

When the TransferCount field of a transfer structure takes the value STOP (0000000 hex), the first DMA controller 320 halts processing. Thus, in this case the transfer structure serves as a STOP command.

When the TransferCount field takes the value SelfConfig (FFFFFFF hex), the first DMA controller 320 performs a series of writes to system memory 206 determined by a configuration list located at the address TransferAddress. A configuration list contains a plurality of address/data pairs. The DMA controller 320 steps through the address/data pairs performing a write operation for each pair: i.e. for each pair the data member is written to the system memory location specified by the address member. The configuration list is terminated by a marker (the integer value FFFFFFF hex). When the first DMA controller 320 reaches the termination marker, the NextPtr of the transfer structure is used to access the next transfer structure. In the present invention, the first DMA controller 320 uses the SelfConfig command to update a status flag in status memory 701. Thus, the configuration list contains one address/data pair followed by a termination marker. The address member of the list points to a status flag in the status memory 701, and the data member takes the value READY (i.e. the integer value which denotes the availability of a memory segment). At system initialization, one such configuration list is initialized for each status flag in the status memory 701 (or equivalently, for each memory segment in buffer memory 344).

Figure 10A:
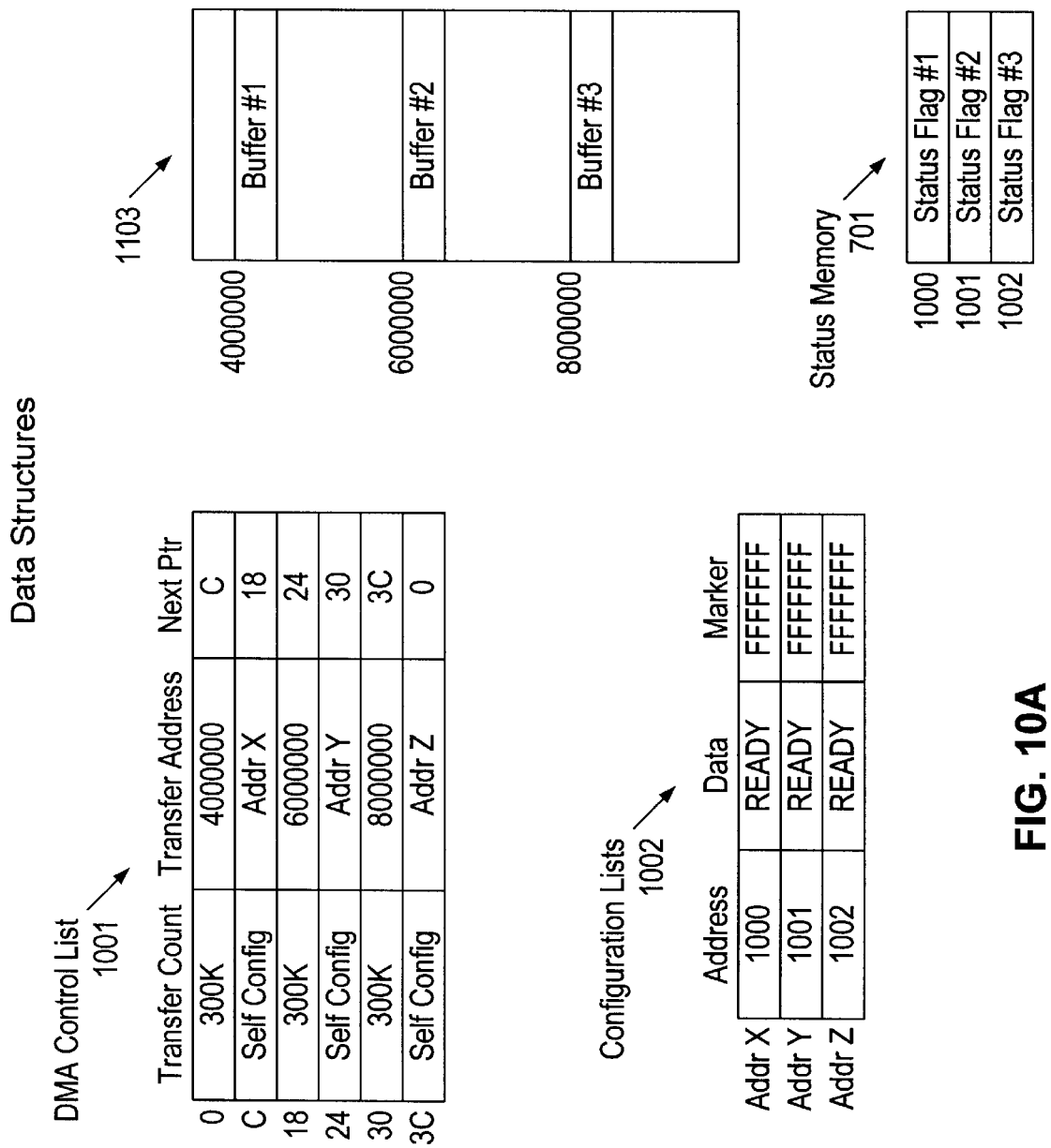
FIG. 10A illustrates the data structures of the present invention which reside in system memory 206.

FIG. 10A: Data Structures

FIG. 10A illustrates the data structures of the present invention which reside in system memory 206. As mentioned above, these data structures include the DMA control list 1001, the configuration lists 1002, and status memory 701. Figure 10A assumes that buffer memory 344 (not shown) contains three memory segments. Thus, the status memory 701 contains three status flags located at system memory addresses 1000, 1001, and 1002 respectively. These status flags correspond (in order) to the three memory segments of buffer memory 344. Also, the DMA Control list 1001 contains six transfer structures located at system memory addresses 0, C, 18, 24, 30, and 3C respectively. Three of these transfer structures correspond to DMA transfer commands: namely the transfer structures with addresses 0, 18, and 30. The transfer structures with addresses C, 24, and 3C correspond to SelfConfig commands. These three SelfConfig commands are used to update the three status flags respectively. In correspondence to the three SelfConfig commands, there are three configuration lists (1002) located at system memory addresses AddrX, AddrY, and AddrZ respectively. Finally, a portion 1103 of system memory 206 used to store video frame data is depicted. In particular, three video frame buffers, labelled Buffer#1, Buffer#2, and Buffer#3, are illustrated at system memory addresses 4000000, 6000000, and 8000000 respectively. These three video frame buffers are the respective targets for data transfers from the three memory segments in buffer memory 344.

Figure 10B:
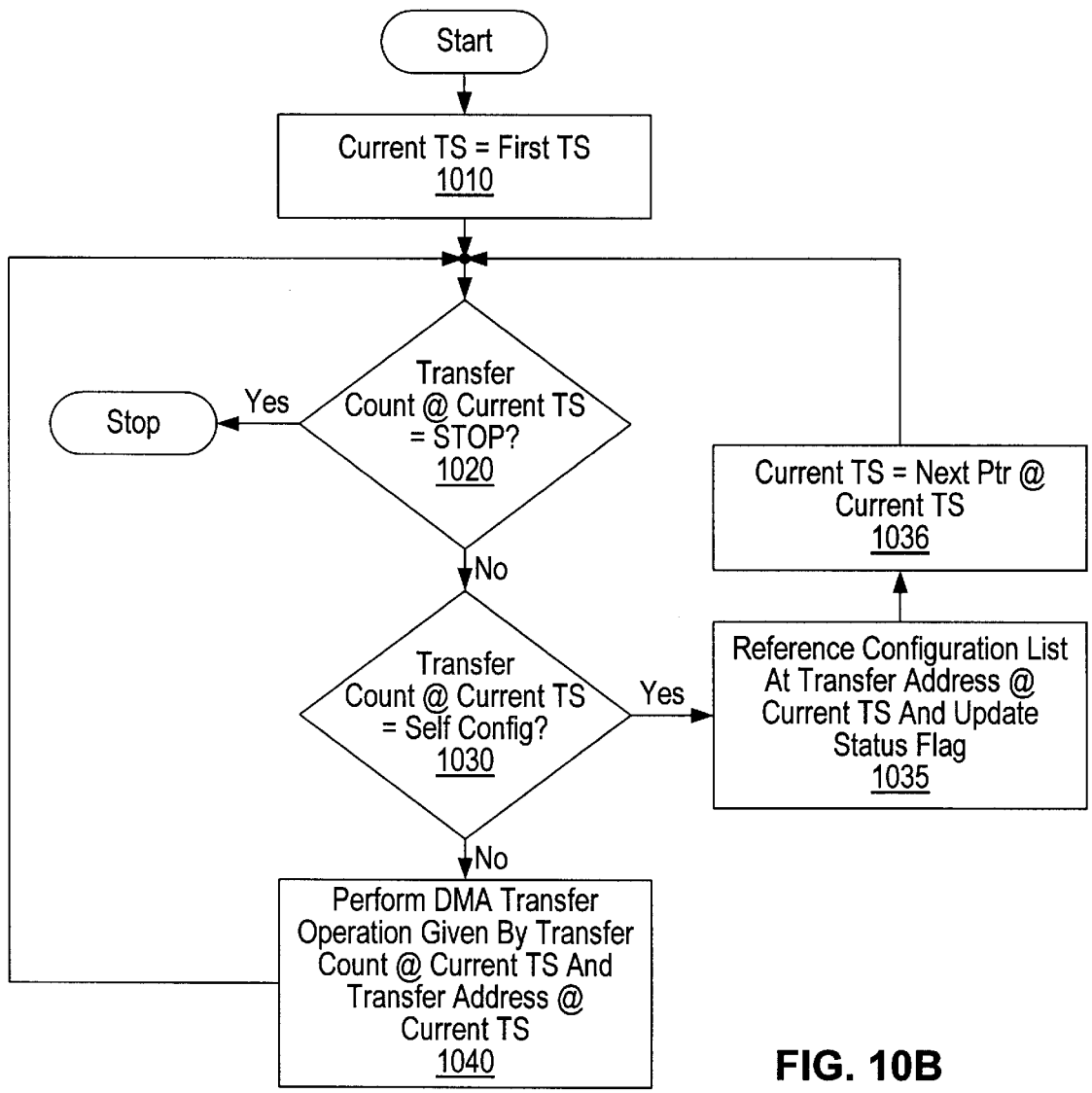
FIG. 10B is a flowchart of the processing loop for the first DMA controller 320 according to the present invention.

FIG. 10B: First DMA Controller Processing Loop

Referring now to FIG. 10B, a flowchart of the processing loop for the first DMA controller 320 is presented. In step 1010, a pointer CurrentTS, which stores the address of a transfer structure in the DMA control list 1001, is initialized with the address FirstTS of the first transfer structure in the DMA control list. In step 1020, a conditional branching is performed depending on the value TransferCount@CurrentTS, i.e. the TransferCount field of the transfer structure pointed to by CurrentTS. If the TransferCount field takes the value STOP, then the first DMA controller 320 terminates processing. If the TransferCount field does not take the value STOP, step 1030 is performed.

In step 1030, another conditional branching is performed depending on the value TransferCount@CurrentTS. If the TransferCount field of the current transfer structure takes the value SelfConfig, the first DMA controller 320 performs steps 1035 and 1036 followed by step 1020. In step 1035, the first DMA controller 320 references the configuration list located at the system memory 206 address given by TransferAddress@CurrentTS, and performs a write to system memory 206 given by the address/data pair in this configuration list. The address member of the pair has been loaded with the system memory address of a status flag in status memory 701. The data member of the pair has been loaded with the predefined value READY, which indicates the availability of a memory segment. This READY value is written to the status flag given by the address member of the pair. In step 1036, the NextPtr member of the current transfer structure, i.e. NextPtr@CurrentTS, is assigned to the pointer CurrentTS. If however, in step 1030, the TransferCount field of the current transfer structure does not take the value SelfConfig, step 1040 is performed.

In step 1040, the first DMA controller performs a DMA transfer from the frame acquisition buffer 340 to system memory. The TransferCount field of the current transfer structure, i.e. TransferCount@CurrentTS, controls the number of locations to be transferred; and the TransferAddress field of the current transfer structure, i.e. TransferAddress@CurrentTS, determines the target address for the DMA transfer. After step 1040, the processing loop reiterates starting with step 1020.

Figure 11:
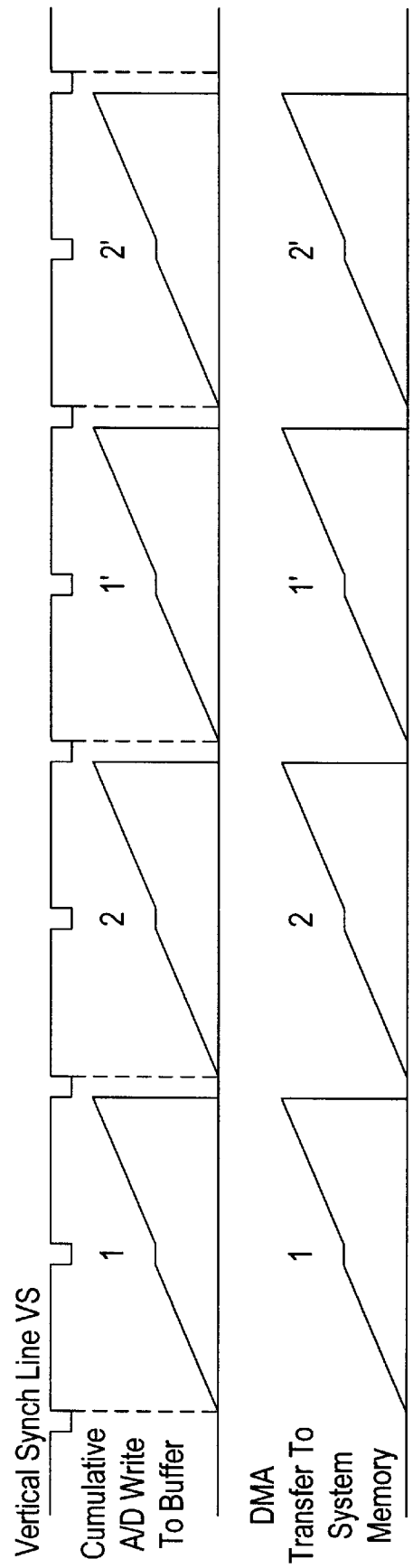
FIG. 11 presents timing diagrams which illustrate the performance of the present invention in the context of a free peripheral bus environment.

FIG. 11: Timing Diagrams in the Context of a Free Bus Environment

Referring now to FIG. 11, timing diagrams which illustrate the performance of the present invention in the context of a free peripheral bus environment are presented. FIG. 11 assumes a buffer memory 344 with two memory segments. The diagram labeled Cumulative A/D Write to Buffer represents cumulative transfer of video samples in a video frame to the frame acquisition buffer 340. This diagram exhibits a ramp waveform each time a video frame is acquired into the frame acquisition buffer 340. (Actually, the ramp waveform has the staircase structure as depicted in FIG. 8.) The diagram labeled DMA Transfer to System Memory represents cumulative transfer of data units from a memory segment (in the frame acquisition buffer 340) to system memory 206 by the first DMA controller 320. This diagram also exhibits a ramp waveform each time a memory segment is transferred to system memory 206. A diagram of the vertical synch line VS is included to show the start time of frame acquisition into the frame acquisition buffer 340. The number above each waveform in FIG. 11 denotes which memory segment is being written to or read from. A superscript attached to the number on a waveform indicates that a memory segment is being overwritten. A superscript implies a memory segment is being written to the second time (overwritten the first time). As a whole, FIG. 11 illustrates how, under a free peripheral bus environment, memory segments become available soon after they are written to by the A/D conversion unit 310. In the case of a free peripheral bus environment, DMA transfer to system memory 206 is limited by the memory controller 345: recall, the memory controller 345 will not let the first DMA controller 320 overrun the A/D conversion unit 310. Thus the ramp waveforms for the DMA Transfer to System Memory are very similar to the ramp waveforms for the Cumulative A/D Write to Buffer. In the time-scale were expanded in FIG. 11, it would become apparent that the ramp waveforms for the DMA Transfer to System Memory are delayed with respect to their waveform counterparts in the Cumulative A/D Write to Buffer diagram. Furthermore, since the first DMA controller 320 transfer data to system memory in bursts, the ramp waveforms for the DMA Transfer to System Memory would have an additional staircase structure due to this burst-oriented transfer.

On the other hand, if the peripheral bus 212 is heavily congested, the first DMA controller 320 empties memory segments slowly while they are being filled at a high rate determined by the average A/D acquisition rate. So the second DMA controller 330, progressing more quickly, will wrap around the status memory 701 (recall the circular topology) and reach a memory segment whose status flag takes the value NOT-READY, indicating that the first DMA controller 320 is still attempting to transfer this memory segment to system memory 206. Thus, there are no more available memory segments, and the second DMA controller 330 must stop processing. In this so-called "stopped" state, the second DMA controller 330 no longer sends enable signals to the A/D conversion unit 310, therefore video frames are no longer acquired into the frame acquisition buffer 340.

Figure 12:
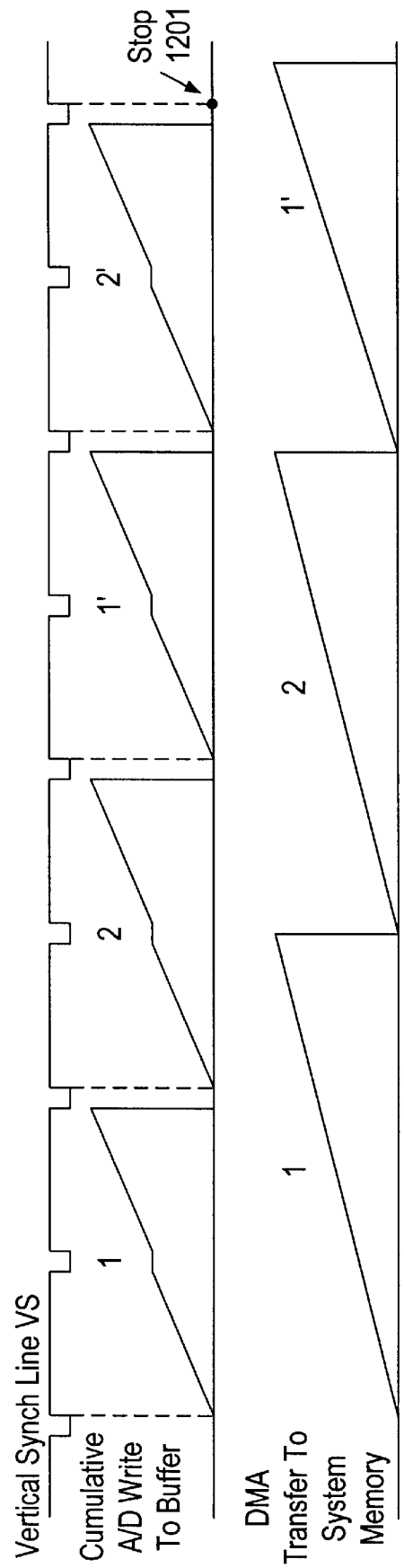
FIG. 12 presents timing diagrams which illustrate performance of the present invention in the context of a heavily congested peripheral bus environment.

FIG. 12: Timing Diagrams in the Context of a Congested Bus Environment

Referring now to FIG. 12, timing diagrams which illustrate performance of the present invention in the context of a heavily congested peripheral bus environment are presented. FIG. 12 assumes a frame acquisition buffer 340 with two memory segments. The diagram labeled Cumulative A/D Write to Buffer represents cumulative transfer of video samples in a video frame to the frame acquisition buffer 340. This diagram exhibits a ramp waveform each time a video frame is written to the frame acquisition buffer 340. [The ramp waveforms when viewed with a finer time-scale resemble the staircase pattern shown in FIG. 8.] The diagram labeled DMA Transfer to System Memory represents cumulative transfer of data units from a memory segment to system memory 206 by the first DMA controller 320. This diagram also exhibits a ramp waveform each time a memory segment is transferred to system memory 206. A diagram of the vertical synch line VS is included to show the start time of A/D acquisition in to the frame acquisition buffer 340. The number above each waveform in FIG. 12 denotes which memory segment is being written to or read from. A superscript attached to a number on a waveform indicate that a memory segment is being overwritten. A superscript implies a memory segment is being written the second time (overwritten the first time). As a whole, FIG. 12 illustrates how, under a heavily congested peripheral bus environment, the transfer of memory segments to system memory 206 increasingly lags behind the filling of memory segments by the A/D conversion unit 310. In the case of a heavily congested peripheral bus environment, DMA transfer to system memory 206 is limited by peripheral bus availability. Thus, the ramp waveforms for the DMA Transfer to System Memory are extended much longer than the ramp waveforms for the Cumulative A/D Write to Buffer. And eventually the system stops, in this Figure, because the first DMA controller 320 is not finished transferring the first memory segment by the time (marked 1201) the second DMA controller 330 would normally command overwriting of the first memory segment.

Figure 13:
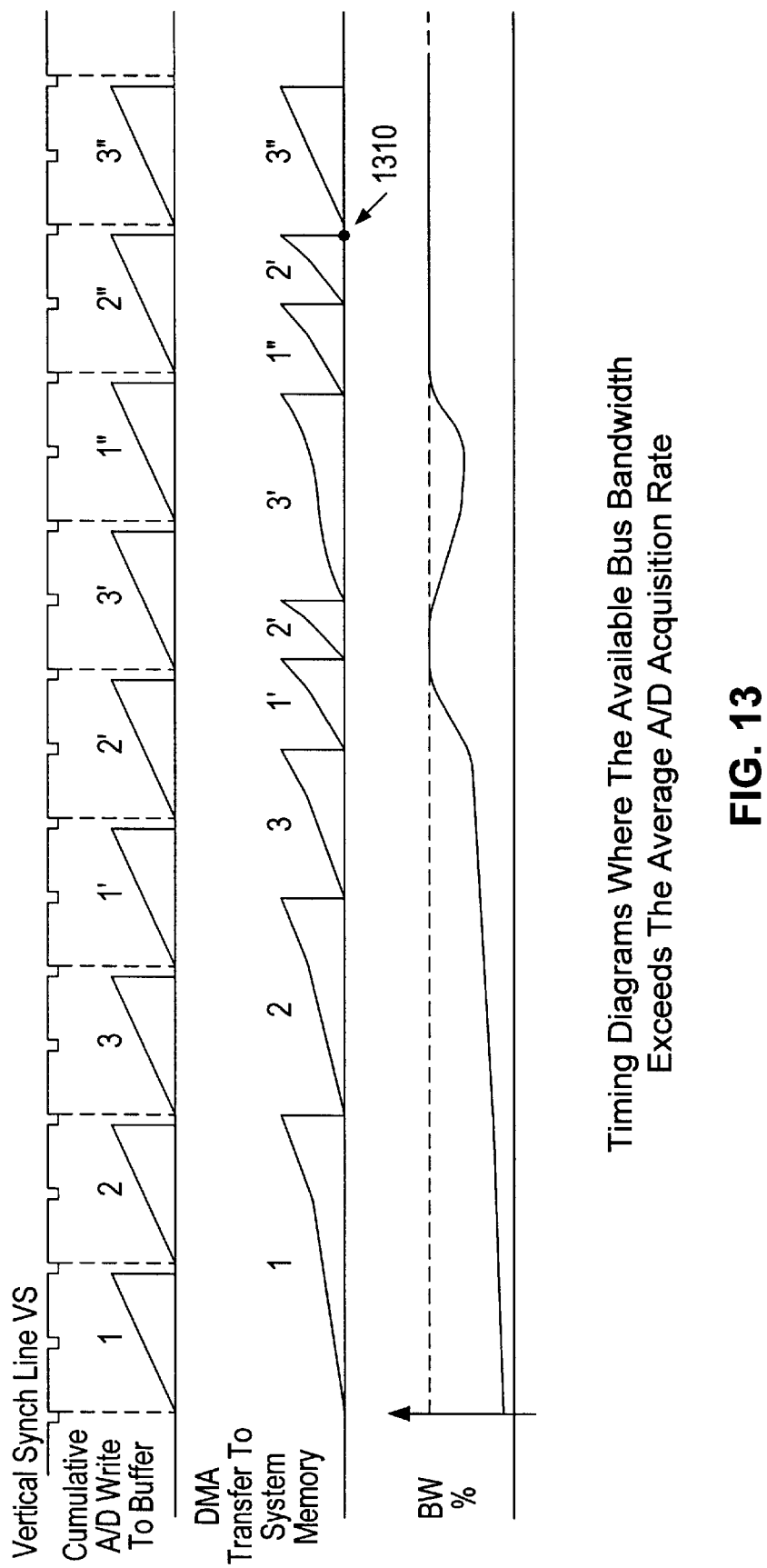
FIG. 13 presents timing diagrams which illustrate the performance of the present invention in the context of a peripheral bus environment where the average available bus bandwidth exceeds the average A/D acquisition rate.

FIG. 13: Timing Diagrams in the Context where the Available Bus Bandwidth Exceeds the Average A/D Acquisition Rate Referring now to FIG. 13, timing diagrams are presented which illustrate the performance of the present invention in the context of a peripheral bus environment where the average available bus bandwidth exceeds the average A/D acquisition rate. FIG. 13 assumes a frame acquisition buffer 340 with three memory segments. The diagram labeled Cumulative A/D Write to Buffer represents cumulative transfer of video samples in a video frame to the frame acquisition buffer 340. This diagram exhibits a ramp waveform each time a video frame acquired into the frame acquisition buffer 340. The diagram labeled DMA Transfer to System Memory represents cumulative transfer of words from a memory segment to system memory 206 by the first DMA controller 320. This diagram also exhibits a ramp waveform each time a memory segment is transferred to system memory 206. A diagram of the vertical synch line VS is included to show the start time of A/D frame acquisition. The diagram labeled Bus BW % represents the available peripheral bus bandwidth in terms of percentage of the maximum bus bandwidth.

The number above each waveform in FIG. 13 denotes which memory segment is being written to or read from. A superscript(s) attached to a number on a waveform indicates that the memory segment is being overwritten. One superscript implies a memory segment is being written to the second time (overwritten the first time). Two superscripts indicate the memory segment is being written to the third time (overwritten the second time). As a whole, FIG. 13 illustrates how, under a peripheral bus environment where the average available bus bandwidth exceeds the net A/D acquisition rate, the frame acquisition buffer 340 is able to accommodate short-term fluctuations in available bus bandwidth. Although video frames accumulate in the frame acquisition buffer 340 when the available bus bandwidth is low, the first DMA controller 320 is able to catch up when the bus bandwidth increases. Observe that the first DMA controller 320 is able to transfer memory segments very quickly when the Bus BW % approaches 100%. By the time (labeled 1310) the first DMA controller has caught up with A/D controller 310. Also, it is noted that by increasing the number of memory segments in buffer memory 344, the video capture board 214 is able to sustain longer periods of sub-critical bus bandwidth without loss of video frames. [Critical bus bandwidth is defined as the rate of A/D acquisition into the frame acquisition buffer 340].

Alternate Embodiments of the Present Invention

Figure 14:
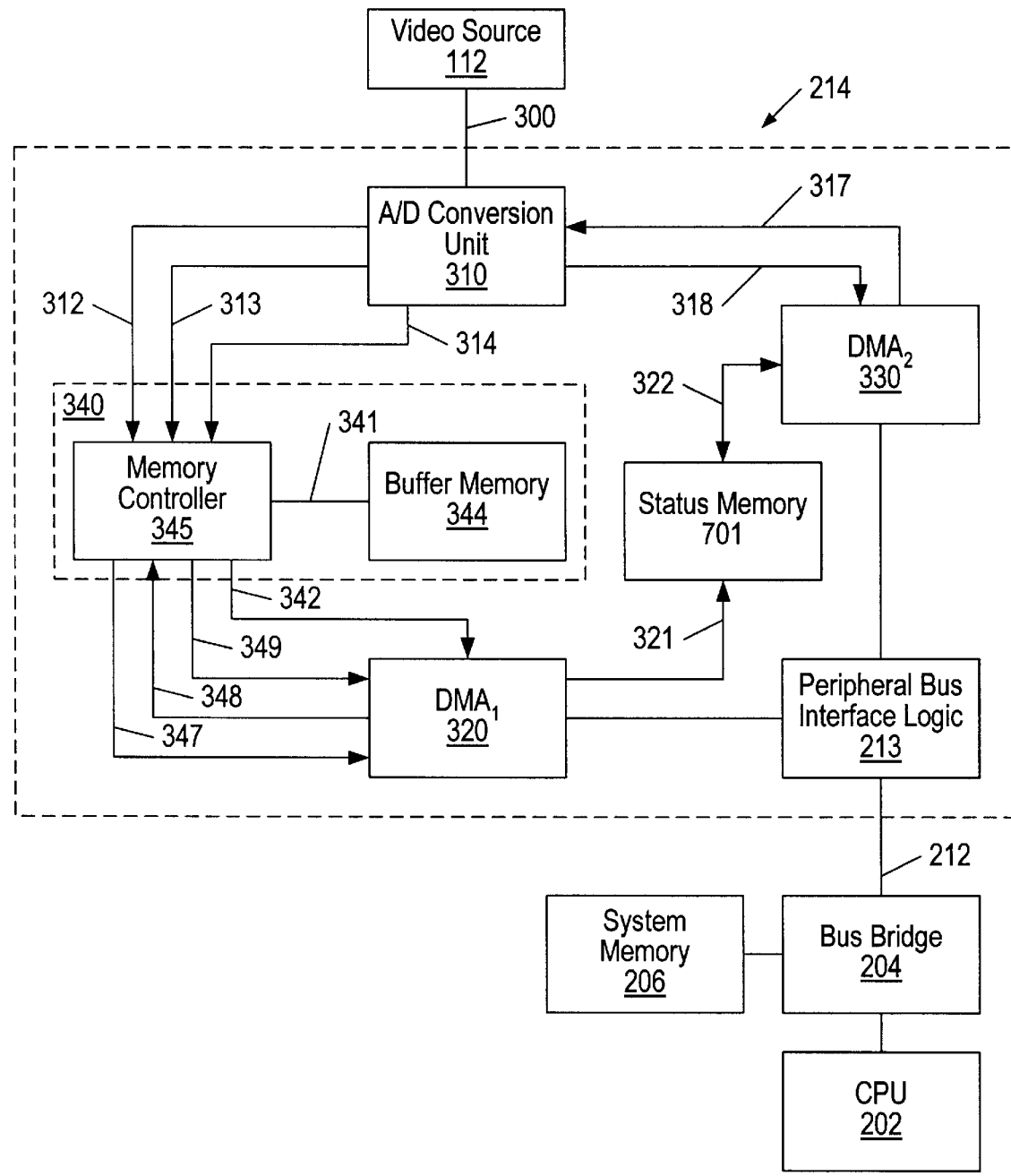
FIG. 14 is a block diagram for a first alternate embodiment of the present invention, wherein status memory 701 is relocated to the video capture board 214.

Referring now to FIG. 14, a first alternate embodiment of the present invention is presented. This alternate embodiment comprises relocating the status memory 701 from system memory 206 to the video capture board 214. Status memory 701 is now situated between the first DMA controller 320 and the second DMA controller 330. Now, the first DMA controller 320 updates status flags in the status memory 701 via status write bus 321, and the second DMA controller 330 reads and writes to status flags via status read/write bus 322.

Figure 15:
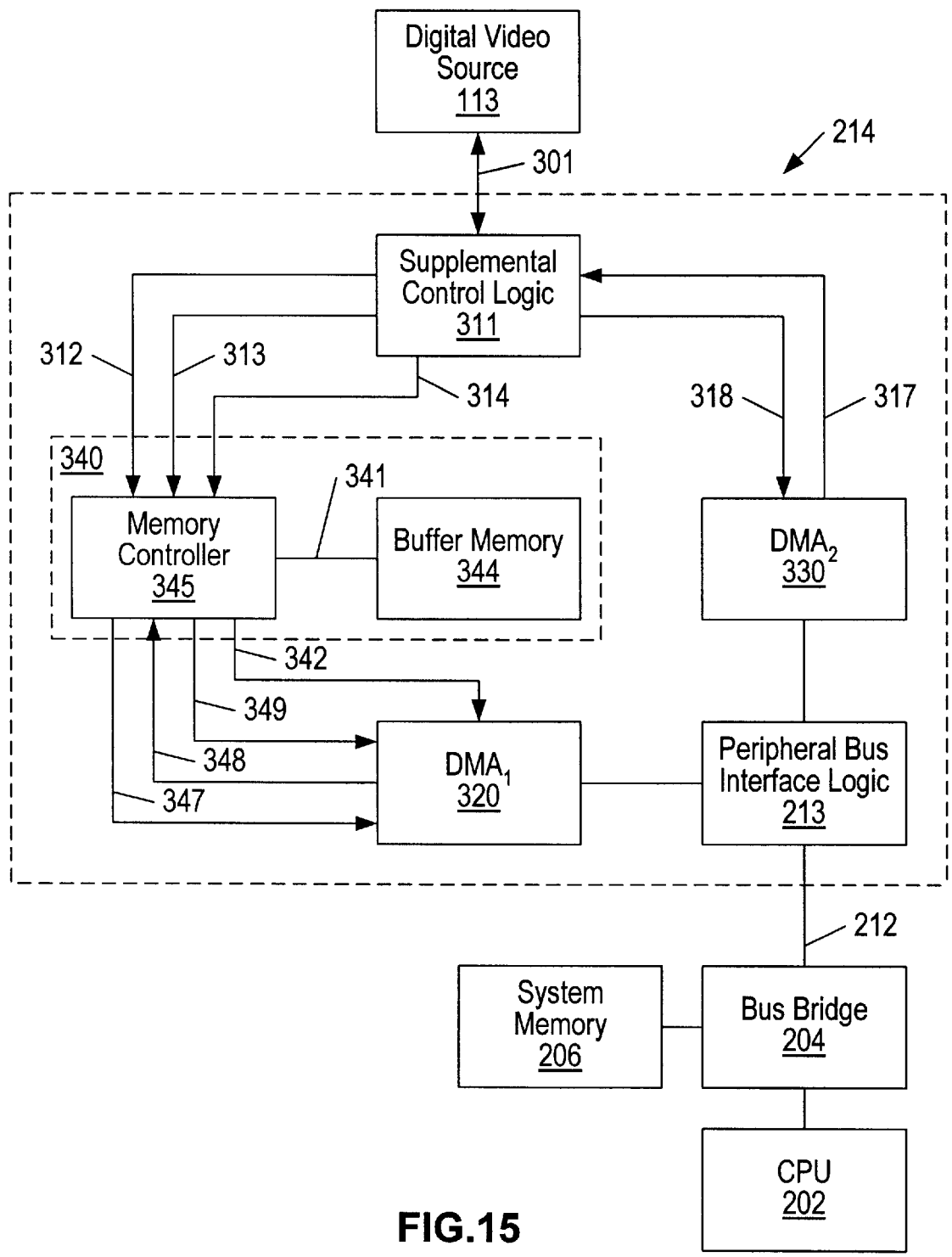
FIG. 15 is a block diagram for a second alternate embodiment of the present invention, wherein support is provided for a digital video source.

Referring now to FIG. 15, a second alternate embodiment of the present invention is presented. This second embodiment comprises providing support for a digital video source 113. Thus, the video capture board 214 includes a digital video port 301 for coupling to the digital video source 113. Also, the A/D conversion unit 310 of the preferred embodiment is replaced with supplemental control logic 311. Supplemental control logic operates in a fashion very much similar to that of A/D conversion unit 310, except that supplemental control logic 311 performs no A/D sampling.

The digital video source 113 provides a digital video signal to the video capture board via the digital video port 301. The digital video signal includes vertical and horizontal synch information. The supplemental control logic 311 acquires video frames into the frame acquisition buffer 340 in response to start enable pulses asserted on the start enable line 317 in conjunction with the horizontal and vertical synch information.

Figure 16:
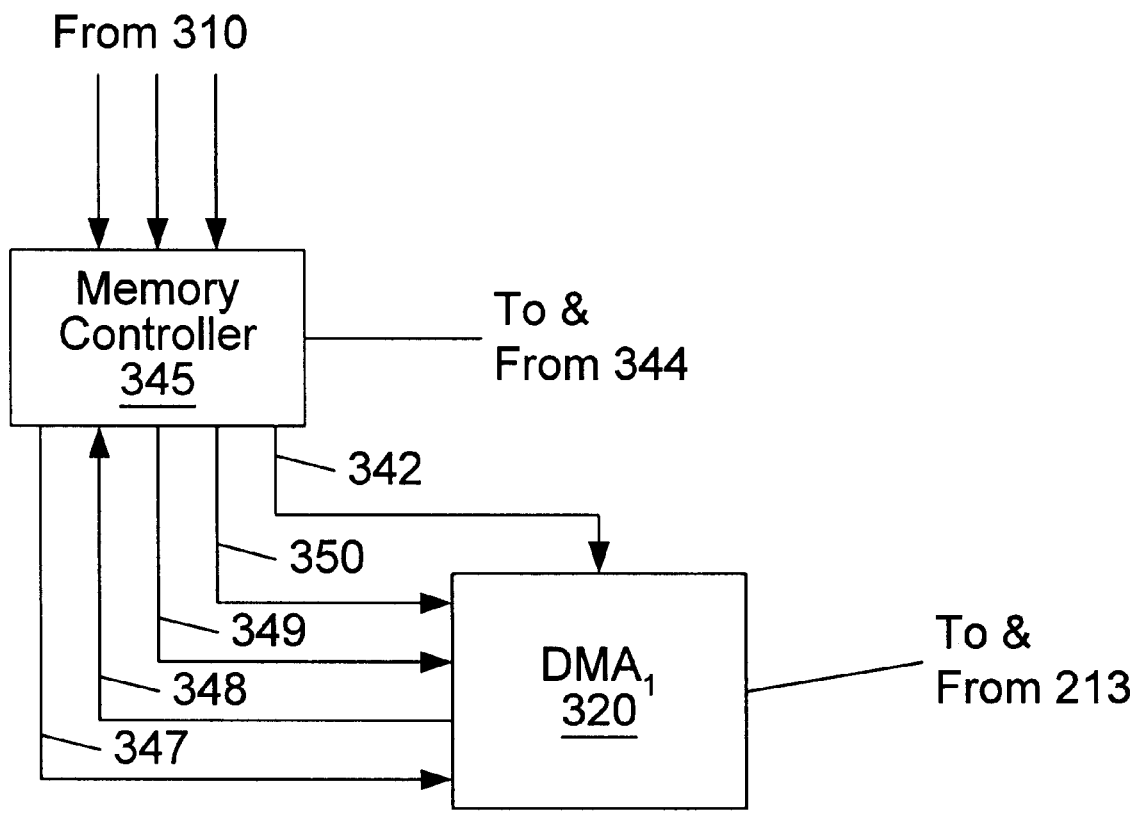
FIG. 16 is a block diagram for a third alternate embodiment of the present invention, wherein modifications have been incorporated for enhancing read transfer rate from the frame acquisition buffer 340.

Referring now to FIG. 16, a third alternate embodiment of the invention is presented. In this third alternate embodiment, several modifications are incorporated into the structure of the first DMA controller 320 and the memory controller 345 to enhance the rate of transfer from the frame acquisition buffer 340 to the first DMA controller 320. Namely, the memory controller 345 maintains a count of the number of buffer memory locations by which read pointer lags behind the write pointer. Also, a specialized data transfer line 350 which couples the memory controller 345 and the first DMA controller 320 is added. The specialized data transfer acknowledge line 350 is used assert the beginning of a multi-word data transfer.

Figure 17:
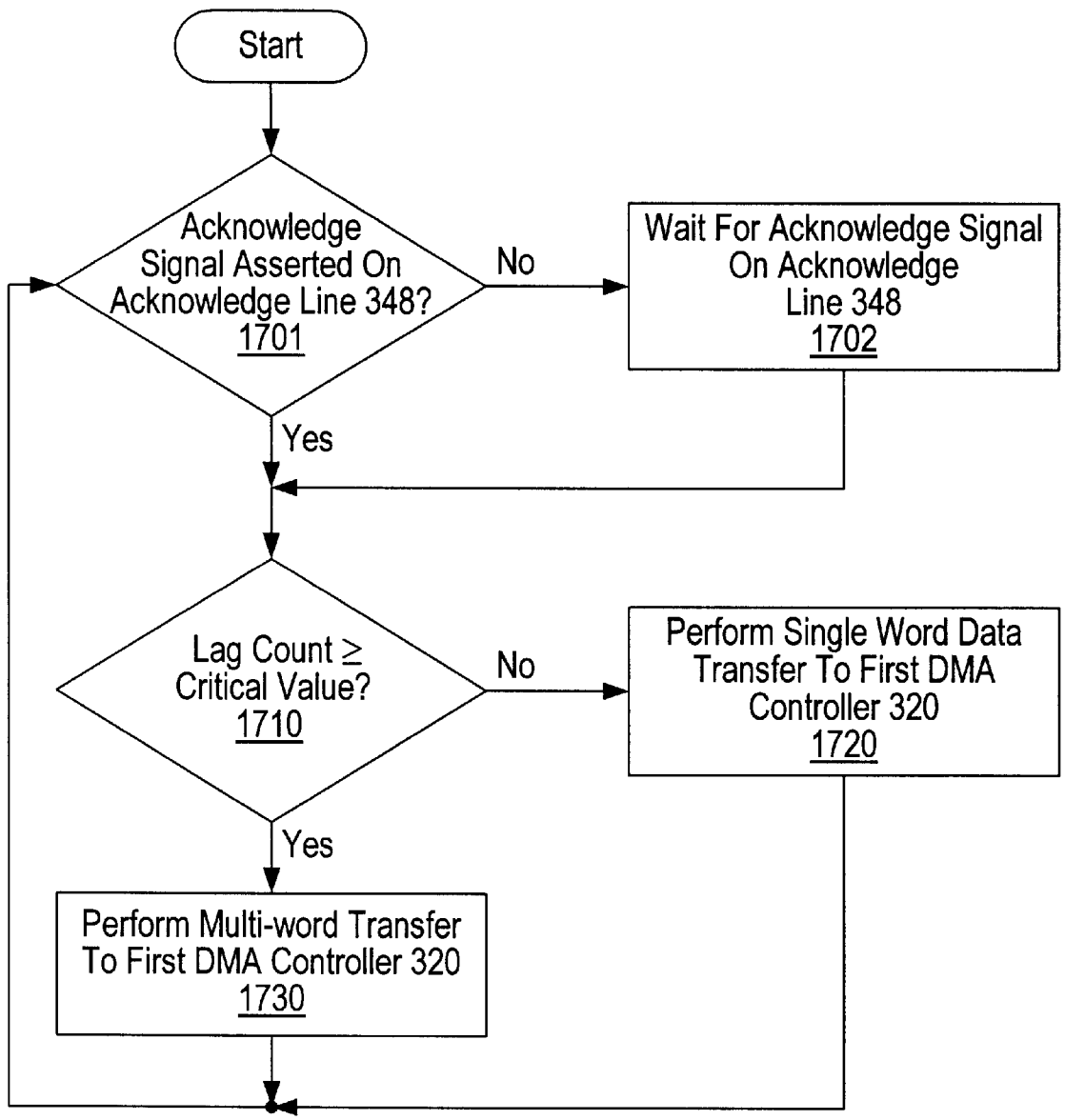
FIG. 17 is a modified flowchart of the read processing loop for memory controller 345.

Referring now to FIG. 17, a modified flowchart of the read processing loop of the memory controller 345 is shown. The flowchart assumes that the lag count is positive and that therefore, the read request signal has been asserted on read request line 347. In step 1701, a conditional branching is performed based on the state of the acknowledge line 348. If an acknowledge signal is being asserted on the acknowledge line 348, step 1710 is performed immediately. If an acknowledge signal is not being asserted, then the memory controller 345 waits for the acknowledge signal before proceeding to step 1710. The waiting comprises step 1702.

In step 1710, the lag count is tested. If the lag count is greater than or equal to an integer CriticalValue, the memory controller 345 performs a multi-word data transfer to the first DMA controller 320. The multi-word transfer, step 1730, includes asserting a signal on the specialized data transfer acknowledge line 350. If the lag count is less than the integer CriticalValue, the memory controller 345 performs a single word data transfer to the first DMA controller 320.

In a fourth alternate embodiment, buffer memory comprises dual-ported RAM, and the A/D conversion unit 310 provides digitized video data directly to the buffer memory 344 under the control of memory controller 345. Thus, in this embodiment, write data bus 312 is coupled between the A/D conversion unit 310 and the buffer memory 344.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

I claim:

1. An image acquisition system comprising:

a first bus which conveys a stream of digital video frames;

a buffer memory coupled to the first bus and comprising a plurality of memory segments;

a status memory which stores information indicating availability or unavailability for each of the memory segments in the buffer memory;

a first direct memory access (DMA) controller coupled to the buffer memory and to the status memory;

frame acquisition control logic coupled to the status memory, wherein the frame acquisition control logic selectively enables the buffer memory to store digital video frames from the stream into the memory segments in response to the availability of the memory segments as indicated by the information in the status memory, wherein the frame acquisition control logic updates the information in the status memory to indicate unavailability of a first memory segment in response to enabling the buffer memory to store a first digital video frame into the first memory segment;

wherein the first DMA controller is configured to perform frame transfers from the memory segments to a computer memory and to update the information in the status memory to indicate availability of the memory segments in response to the frame transfers.

2. The image acquisition system of claim 1, wherein the information stored in the status memory comprises a plurality of status flags, wherein each status flag of the plurality of status flags indicates availability or unavailability of a corresponding memory segment.

3. The image acquisition system of claim 2, wherein the first DMA controller sets a first status flag to indicate availability of the first memory segment in response to completing a frame transfer of the first digital video frame from the first memory segment to the computer memory.

4. The image acquisition system of claim 2, wherein the frame acquisition control logic checks a first status flag to ensure availability of the first memory segment before enabling storage of the first digital video frame into the first memory segment.

5. The image acquisition system of claim 2, wherein the frame acquisition control logic sets a first status flag corresponding to the first memory segment to indicate unavailability of the first memory segment in response to the frame acquisition control logic enabling storage of the first digital video frame into the first memory segment.

6. The image acquisition system of claim 2, wherein the buffer memory receives and writes the digital video frames of said stream into the memory segments in a cyclic fashion;
wherein the frame acquisition control logic examines a next status flag corresponding to a next memory segment to be overwritten and enables storage of a next digital video frame of said stream in response to the next status flag indicating availability of the next memory segment.

7. The image acquisition system of claim 6, wherein the frame acquisition control logic disables storage of the next digital video frame of said stream into the buffer memory in response to the next status flag indicating unavailability of the next memory segment.

8. The image acquisition system of claim 6, wherein the buffer memory maintains a read pointer and a write pointer into a random access memory (RAM) which contains the memory segments, wherein the write pointer indicates write activity of the digital video frames into the memory segments, wherein the read pointer indicates read activity of the digital video frames being transferred to computer memory, wherein the buffer memory asserts a request to the first DMA controller for read activity when the write pointer leads the read pointer.

9. The image acquisition system of claim 6, wherein the first DMA controller is configured to read and execute a linked control list stored in the computer memory, wherein the control list directs the frame transfers from the memory segments to a set of target buffers in the computer memory.

10. The image acquisition system of claim 1, wherein the status memory is organized as a circularly linked list.

11. The image acquisition system of claim 1 further wherein the first DMA controller performs the frame transfers to the computer memory through a computer bus, wherein the first DMA controller arbitrates for control of the computer bus, and performs the frame transfers subject to availability of the computer bus.

12. The image acquisition system of claim 1, further comprising:
an analog to digital (A/D) converter including an input which is coupled to receive an analog video signal from a video source, wherein the A/D converter digitizes the analog video signal to produce the stream of digital video frames, wherein the A/D converter asserts the stream of digital video frames onto the first bus.

13. The image acquisition system of claim 1, wherein the status memory is comprised in the computer memory.

14. The image acquisition system of claim 1, wherein the frame acquisition control logic comprises a second DMA controller.

15. A method for acquiring a stream of digital video frames into a computer memory, the method comprising:
(a) frame acquisition control logic selectively enabling storage of the digital video frames into a buffer memory which includes a plurality of memory segments in response to information in a status memory indicating availability of the memory segments;
(b) the frame acquisition control logic updating the information in the status memory to indicate unavailability of a first memory segment in response to enabling storage of a first digital video frame into the first memory segment;
(c) a first DMA controller performing frames transfers from the memory segments to the computer memory;
(d) the first DMA controller updating the information in the status memory to indicate the availability of the memory segments in response to the frame transfers to the computer memory.

16. The method of claim 15, wherein the information stored in the status memory comprises a plurality of status flags, wherein each status flag of the plurality of status flags indicates availability or unavailability of a corresponding one of the memory segments.

17. The method of claim 16, wherein (d) includes the first DMA controller setting a first status flag to indicate availability of the first memory segment in response to completing one of the frame transfers from the first memory segment to the computer memory.

18. The method of claim 16, wherein (a) includes the frame acquisition control logic checking a first status flag to ensure availability of the first memory segment before enabling storage of the first digital video frame into the first memory segment.

19. The method of claim 16, wherein (b) includes the frame acquisition control logic setting a first status flag corresponding to the first memory segment to indicate unavailability of the first memory segment in response to enabling storage of the first digital video frame into the first memory segment.

20. The method of claim 16 further comprising the buffer memory receiving and writing the digital video frames into the memory segments in a cyclic fashion in response to (a);
wherein (a) includes the frame acquisition control logic examining a next status flag corresponding to a next memory segment to be overwritten, and enabling storage of a next digital video frame of said stream in response to the next status flag indicating availability of the next memory segment.

21. The method of claim 20, wherein (a) includes the frame acquisition control logic disabling storage of the next digital video frame of said stream into the buffer memory in response to the next status flag indicating unavailability of the next memory segment.

22. The method of claim 20 further comprising:
the buffer memory maintaining a read pointer and a write pointer into a random access memory (RAM) which contains the memory segments, wherein the write pointer indicates write activity of the digital video frames into the memory segments, wherein the read pointer indicates read activity of the digital video frames being transferred to computer memory; and the buffer memory asserting a request to the first DMA controller for read activity when the write pointer leads the read pointer.

23. The method of claim 20, wherein (d) includes the first DMA controller reading and executing a linked control list stored in the computer memory, wherein the control list directs the frame transfers from the memory segments to a set of target buffers in the computer memory.

24. The method of claim 15, wherein the status memory is organized as a circularly linked list.

25. The method of claim 15 further comprising the first DMA controller arbitrating for control of a computer bus and performing the frame transfers through the computer bus subject to availability of the computer bus.

26. The method of claim 15, further comprising an analog to digital (A/D) converter receiving an analog video signal from a video source, and digitizing the analog video signal to produce the stream of digital video frames.

27. The method of claim 15, wherein the status memory is comprised in the computer memory.

28. The method of claim 15, wherein the frame acquisition control comprises a second DMA controller.

29. An image acquisition system, comprising:
   a computer system, comprising:
      a processor;
      a first bus coupled to the processor which conveys a stream of digital video frames;
      a buffer memory coupled to the first bus and comprising a plurality of memory segments; and
      a status memory which stores information indicating availability or unavailability for each of the memory segments in the buffer memory; and
   an image acquisition device, comprising:
      a first direct memory access (DMA) controller coupled to the buffer memory and to the status memory; and
      frame acquisition control logic coupled to the status memory, wherein the frame acquisition control logic selectively enables the buffer memory to store digital video frames from the stream into the memory segments in response to the availability of the memory segments as indicated by the information in the status memory, wherein the frame acquisition control logic updates the information in the status memory to indicate unavailability of a first memory segment in response to enabling the buffer memory to store a first digital video frame into the first memory segment;
   wherein the first DMA controller is configured to perform frame transfers from the memory segments to a computer memory and to update the information in the status memory to indicate availability of the memory segments in response to the frame transfers.

* * * * *